United States Patent
Hatono et al.

(10) Patent No.: US 8,241,703 B2
(45) Date of Patent: Aug. 14, 2012

(54) PRE-FORMED CONTROLLED PARTICLE FORMED OF FINE PARTICLES NON-CHEMICALLY BONDED TOGETHER, COMPOSITE STRUCTURE FORMATION METHOD INVOLVING CONTROLLED PARTICLES, AND COMPOSITE STRUCTURE FORMATION SYSTEM INVOLVING CONTROLLED PARTICLE

(75) Inventors: Hironori Hatono, Fukuoka-ken (JP);
Masahiro Mizukane, Fukuoka-ken (JP);
Osamu Okamoto, Fukuoka-ken (JP)

(73) Assignee: Toto Ltd., Fukuoka (JP)

( * ) Notice: Subject to any disclaimer, the term of this patent is extended or adjusted under 35 U.S.C. 154(b) by 646 days.

(21) Appl. No.: 12/381,225

(22) Filed: Mar. 9, 2009

(65) Prior Publication Data
US 2009/0324933 A1 Dec. 31, 2009

Related U.S. Application Data

(60) Provisional application No. 61/055,469, filed on May 23, 2008.

(30) Foreign Application Priority Data

Mar. 10, 2008 (JP) .................................. 2008-060189
Mar. 6, 2009 (JP) .................................. 2009-053493

(51) Int. Cl.
*B05D 1/12* (2006.01)

(52) U.S. Cl. ......... 427/201; 427/185; 427/426; 427/427

(58) Field of Classification Search .................. 427/185, 427/201, 426, 427
See application file for complete search history.

(56) References Cited

U.S. PATENT DOCUMENTS

| 7,153,567 | B1 | 12/2006 | Akedo et al. |
| 2007/0231480 | A1* | 10/2007 | Yasui ............................ 427/212 |

FOREIGN PATENT DOCUMENTS

| JP | 3348154 B2 | 11/2002 |
| JP | 2005-023365 | 1/2005 |
| JP | 2006-082023 | 3/2006 |
| JP | 2006-200013 A | 8/2006 |
| JP | 2006-219764 | 8/2006 |
| JP | 2006-233334 A | 9/2006 |
| JP | 2007-291502 A | 11/2007 |
| JP | 2008-001968 | 1/2008 |

* cited by examiner

*Primary Examiner* — Frederick Parker
(74) *Attorney, Agent, or Firm* — Carrier Blackman & Associates, P.C.; Joseph P. Carrier; William D. Blackman

(57) ABSTRACT

A composite structure formation method based on an aerosol deposition method by which an aerosol with brittle material fine particles dispersed in a gas is sprayed toward a substrate to form a structure made of the brittle material fine particles, the composite structure formation method includes: storing a plurality of controlled particles in a storage mechanism, the controlled particle being an assembly packed with a plurality of particles including the brittle material fine particles; supplying the controlled particles from the storage mechanism to an aerosolation mechanism; disaggregating the supplied controlled particles in the aerosolation mechanism to form an aerosol; and spraying the aerosol toward the substrate to form a composite structure having the structure and the substrate.

**11 Claims, 26 Drawing

FIG. 1A        FIG. 1B        FIG. 1C

```
         100
              ┌─────────────┐        31
              │   STORAGE   │    ●●●●●
      ┌──────→│  MECHANISM  │    ●●●●●
      │       └─────────────┘    ●●●●●
      │              │            ● ●
  ┌───┴──────┐  ┌────┴────────┐    ●
  │ GAS SUPPLY│  │  CONSTANT  │    ● ●
  │ MECHANISM │─→│   SUPPLY   │    ●   31
  └──────────┘  │  MECHANISM │    ●  }33
                └────┬───────┘    ●  G
                     │16           ●
                     │             ●
                     │             ●
                     │           ░░░░
              ┌──────┴──────┐   ░░░░
     ┌───────→│ AEROSOLATION│   ░░░░ ←32
     │        │  MECHANISM  │   ░░░░
     │        └──────┬──────┘   ░░░░
     │               │5         ░░░░
     │        ┌──────┴──────┐   ░░░░
     └───────→│  DISCHARGE  │   ░░░░
              │    PORT     │   ░░░░
              └─────────────┘    30P
```

| SOLID PHASE |
|---|
| SOLID-GAS MIXED PHASE FLOW |
| AEROSOL |

FIG. 14A    FIG. 14B    FIG. 14C

FINE PARTICLE

FINE PARTICLE

PRE-FORMED CONTROLLED PARTICLE FORMED OF FINE PARTICLES NON-CHEMICALLY BONDED TOGETHER, COMPOSITE STRUCTURE FORMATION METHOD INVOLVING CONTROLLED PARTICLES, AND COMPOSITE STRUCTURE FORMATION SYSTEM INVOLVING CONTROLLED PARTICLE

CROSS-REFERENCE TO RELATED APPLICATIONS

This application is based upon and claims the benefit of priority from the prior Japanese Patent Application No. 2008-060189, filed on Mar. 10, 2008, the prior U.S. Provisional Application 61/055,469 filed on May 23, 2008, and the prior Japanese Patent Application No. 2009-053493, filed on Mar. 6, 2009; the entire contents of which are incorporated herein by reference.

BACKGROUND OF THE INVENTION

1. Field of the Invention

This invention generally relates to a composite structure formation method based on the aerosol deposition method by which an aerosol with fine particles of a brittle material dispersed in a gas is sprayed onto a substrate to form a structure made of the fine particles on the substrate, a controlled particle for use therein, and a composite structure formation system.

2. Description of the Related Art

The "aerosol deposition method" is one of the methods for forming a structure made of a brittle material on the surface of a substrate (see, e.g., Japanese Patent No. 3348154, JP-A-2006-200013(Kokai), and JP-A-2006-233334(Kokai)). In this method, an aerosol in which fine particles including a brittle material are dispersed in a gas is sprayed from a discharge port toward the substrate to collide the fine particles with the metal, glass, ceramic, or plastic substrate, deforming or fracturing the brittle material fine particles by the impact of this collision to join them together, so that a film-like structure made of the fine particles is directly formed on the substrate. This method can form a film-like structure at normal temperature without requiring any specific heating means and the like, and can provide a film-like structure having a mechanical strength which is at least comparable to that of a sintered body. Furthermore, the condition for colliding the fine particles as well as the shape, composition and the like of the fine particles can be controlled to diversely vary the density, mechanical strength, electrical characteristics and the like of the structure.

To form a large-area film-like structure by this aerosol deposition method, fine particles need to be continuously supplied for a prescribed period of time. In particular, in the case where a high film thickness accuracy is required, it is desired that the supply quantity of fine particles be constantly stable.

However, as disclosed in Japanese Patent No. 3348154, if aerosolation occurs in a storage mechanism which stores fine particles of a raw material, the fine particles stored in the storage mechanism may change the state over time, leaving a problem with stable supply of the aerosol. Furthermore, the capacity of the storage mechanism needs to be far larger than the volume of fine particles to secure the capacity for aerosolation, which may require a large-scale apparatus.

In this context, in the technique proposed in JP-A-2006-200013(Kokai), the storage mechanism for storing fine particles is separated from the aerosolation mechanism for mixing the fine particles with a gas to produce an aerosol, and the fine particles are supplied from the storage mechanism to the aerosolation mechanism by required amount.

However, in the case where submicron or smaller fine particles are used as primary particles, because of their high viscosity and adhesiveness, the problems of adhesion, stacking and the like to the wall surface are likely to occur inside the storage mechanism and in the process of supply from the storage mechanism to the aerosolation mechanism, which may make it difficult to supply reliably. For example, fine particles are likely to aggregate due to agitation and migration inside the storage mechanism and change their fluidity. Eventually, stacking occurs inside the storage mechanism and prevents migration of powder to the aerosolation mechanism, which may lose the constancy of the supply quantity. Furthermore, adhesion occurring inside the storage mechanism may also yield adverse effects, such as failing to achieve powder usage as planned.

In this regard, in the technique proposed in JP-A-2006-233334(Kokai), a split supply mechanism for supplying fine particles from the storage mechanism to the aerosolation mechanism is provided, and the fine particles stored in the storage mechanism are split into a plurality of groups and supplied by the split supply mechanism.

However, the following problems may occur in the case where a batch of brittle material fine particle powder stored in the storage mechanism is split into a plurality of groups and supplied by the split supply mechanism. Originally, the brittle material fine particle powder stored in the storage mechanism is not controlled in density and lacks uniformity in fluidity. Accordingly, the group of fine particles split in a prescribed size and shape may be nonuniform in shape and density when supplied from the storage mechanism. In some cases, the trouble of stacking of brittle material fine particle powder occurs in the storage mechanism. In such cases, even using an aerosolation mechanism having a prescribed disaggregation capability, it is difficult to generate an aerosol with a constantly stable fine particle concentration. Furthermore, if the group of fine particles split in a prescribed size and shape changes in shape or density during the supply process, it may be also difficult to accurately control the fine particle concentration in the aerosol. Moreover, at low density, the shape may collapse during the supply and cause fine particles to adhere to the inner wall of the apparatus, impairing constancy of quantity.

Patent Document: Japanese Patent No. 3348154
Patent Document: JP-A-2006-200013 (Kokai)
Patent Document: JP-A-2006-233334 (Kokai)

SUMMARY OF THE INVENTION

According to an aspect of the invention, there is provided a composite structure formation method based on an aerosol deposition method by which an aerosol with brittle material fine particles dispersed in a gas is sprayed toward a substrate to form a structure made of the brittle material fine particles, the composite structure formation method including: storing a plurality of controlled particles in a storage mechanism, the controlled particle being an assembly packed with a plurality of particles including the brittle material fine particles; supplying the controlled particles from the storage mechanism to an aerosolation mechanism; disaggregating the supplied controlled particles in the aerosolation mechanism to form an aerosol; and spraying the aerosol toward the substrate to form a composite structure having the structure and the substrate.

According to another aspect of the invention, there is provided a controlled particle for use in an aerosol deposition method by which an aerosol with brittle material fine particles dispersed in a gas is sprayed toward a substrate to form a structure made of the brittle material fine particles, the controlled particle including: an assembly packed with a plurality of particles including the brittle material fine particles having a mean primary particle diameter of 0.1 μm or more and 5 μm or less.

According to another aspect of the invention, there is provided a composite structure formation system for use in an aerosol deposition method by which an aerosol with brittle material fine particles dispersed in a gas is collided with a substrate to form a composite structure having the substrate and a structure made of the brittle material fine particles, the composite structure formation system including: a storage mechanism configured to store controlled particles for use in an aerosol deposition method by which an aerosol with brittle material fine particles dispersed in a gas is sprayed toward a substrate to form a structure made of the brittle material fine particles, the controlled particles including: an assembly packed with a plurality of particles including the brittle material fine particles having a mean primary particle diameter of 0.1 μm or more and 5 μm or less; a supply mechanism configured to supply the controlled particles from the storage mechanism; a gas supply mechanism configured to introduce a gas toward the supplied controlled particles; an aerosolation mechanism configured to apply an impact to the controlled particles mixed with the gas to disaggregate the controlled particles and form an aerosol; and a discharge port configured to spray the aerosol onto the substrate.

BRIEF DESCRIPTION OF THE DRAWINGS

FIGS. 1A to 1C are schematic views for illustrating the basic configuration of a composite structure formation system according to a first embodiment of the invention;

FIGS. 14A to 14C are schematic views for illustrating the basic configuration of a composite structure formation system according to a second embodiment of the invention;

DETAILED DESCRIPTION OF THE INVENTION

Figure 2:
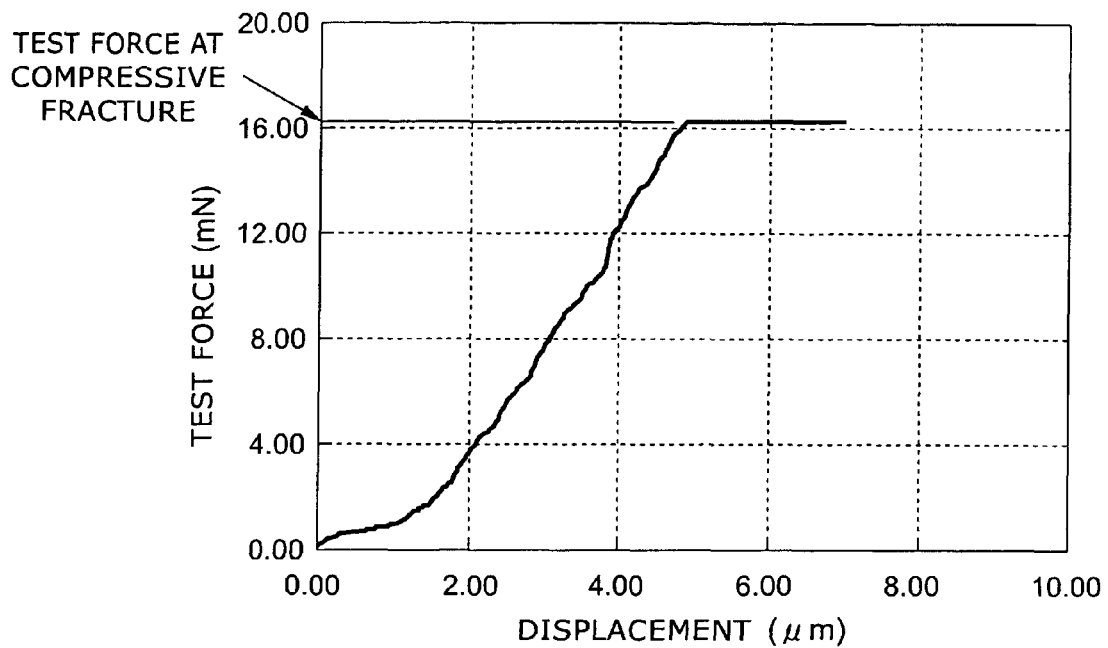
FIG. 2 is a graph for illustrating the measurement of compressive fracture strength.

Before the description of embodiments of the invention, terms used herein are first described.

The term "fine particle" as used herein refers to a particle formed by chemical bonding of brittle material crystals. This fine particle used in the aerosol deposition method illustratively includes those having a mean primary particle diameter of 0.1 μm or more and 5 μm or less as described in Japanese Patent No. 3348154. Here, determination of the mean primary particle diameter can be based on the method of calculating a circle-equivalent diameter from the image of a plurality of (desirably 50 or more) brittle material fine particles obtained by electron microscopic observation.

"Primary particle" refers to the minimum unit (single particle) of the fine particle.

"Controlled particle" refers to an assembly packed with a plurality of particles including brittle material fine particles having a mean primary particle diameter of 0.1 μm or more and 5 μm or less. That is, the controlled particle is formed through the step of artificial compaction.

The controlled particle keeps its shape by physical attraction force (static electricity, van der Waals force, and cross-linking attraction of water) as main bonding force, and at least one of the bonding strength and shape is intentionally controlled. Alternatively, the controlled particle keeps its shape by attraction force such that it collapses by irradiation of supersonic waves in water as main bonding force, and at least one of the bonding strength and shape is intentionally controlled.

Compressive fracture strength of the controlled particle can serve as an indicator of its bonding strength.

Circularity can serve as an indicator of the shape of the controlled particle.

Preferably, the controlled particle is intentionally controlled in its diameter. A mean circle-equivalent diameter of the controlled particle can serve as an indicator of its diameter.

Preferably, the controlled particles are intentionally controlled in their particle diameter distribution. D10 or particle size distribution deviation ratio can serve as an indicator of the particle diameter distribution of the controlled particles.

Preferably, in the controlled particles brittle material fine particles contained therein are not compacted, by chemical bonding therebetween, to a size which is significantly larger than the diameter of the primary particle. The brittle material fine particles chemically bonded to each other refer to what looks like a primary particle of a porous material in which fine particles are fused together at their surfaces under heat treatment and the like to cause neck formation. Although this can be identified by electron microscopic observation, the existence of chemical bonding can be concluded if a collection of a plurality of fine particles is put into water or an alcohol solvent, for example, and it is not dispersed or easily collapsed. In the case where primary particles are compacted in units of several particles, the fine particle diameter may be allowable for structure formation in the aerosol deposition method, and there is no significant problem even if particles in such a state are actually included. This state can also be identified by electron microscopic observation of brittle material fine particles which are sufficiently dispersed and fixed on the observation stage.

"Aggregate particle" refers to a collection of a plurality of fine particles which is spontaneously formed from the fine particles bonded to each other, where its bonding strength and shape are not controlled.

"Disaggregation" refers to an action on the controlled particle, in which particles composed primarily of brittle material fine particles are compacted by physical attraction, to separate the individual brittle material fine particles by applying external force such as impact, friction, vibration, and charging. Here, the disaggregation does not need to separate all the primary particles to the monodisperse state, but as described later, the disaggregation only needs to ensure a separation state allowing structure formation with industrial applicability.

That the controlled particles being supplied from the storage container are not disaggregated can be determined by measuring the stability of the supply quantity of controlled particles over time or by comparing the shape of the controlled particle in the storage container with that immediately before aerosolation.

Here, if the controlled particles are disaggregated when supplied from the storage container, brittle material fine particles dropped off from the controlled particles are adhered to the storage container and the aerosolation mechanism where the controlled particles are brought into contact, causing clogging at such contact sites. This hampers migration of the controlled particles, and the supply quantity tends to vary over time.

That the controlled particles are disaggregated in the aerosolation mechanism can be determined by comparing by observation the shape and state of the controlled particle immediately before aerosolation with those of the controlled particle immediately after aerosolation.

Here, disaggregation can be affirmed by verifying the state change in which the number of controlled particles clearly decreases and primary particles included therein emerge frequently. For example, disaggregation can be affirmed if the ratio of the number of controlled particles in a certain weight of controlled particles after disaggregation to that in the same weight before the disaggregation is one fifth or less, preferably one tenth or less, and more preferably one hundredth or less. These can be verified illustratively by optical microscopic observation.

"Aerosol" refers to a solid-gas mixed phase composition in which fine particles are dispersed in a gas such as helium, nitrogen, argon, oxygen, dry air, and a mixed gas including them, where substantially most of the fine particles are dispersed nearly separately, although the aerosol may partly include aggregate particles. The gas pressure and temperature of the aerosol are arbitrary. However, the concentration of fine particles in the gas at the point of being sprayed from a discharge port, in terms of the value at a gas pressure of 1 atmosphere and a temperature of 20 degrees Celsius, is preferably in the range from 0.0003 to 10 mL/L for forming a film-like structure.

"Solid-gas mixed phase flow" refers to the state in which controlled particles controlled to a prescribed bonding strength or shape are migrating on a gas flow. In the solid-gas mixed phase flow, the controlled particles exist substantially separately in the gas flow.

"Solid phase" refers to the state in which controlled particles are nearly independent of the gas flow.

"Stacking" refers to the prevention of particle migration in a container or a channel traversed by particles due to adhesion of particles or aggregation of the particles themselves, or to the state in which it occurs. Stacking is likely to occur at a location where the cross-sectional shape of the channel traversed by particles is downsized, such as the outlet of the storage mechanism, the inlet of the supply mechanism, and the supply channel, described later.

Next, embodiments of the invention are described with reference to the drawings.

FIG. 1 is a schematic view for illustrating the basic configuration of a composite structure formation system according to a first embodiment of the invention. More specifically, FIG. 1A is a block diagram for illustrating the basic configuration of a composite structure formation system (aerosol deposition apparatus), FIG. 1B schematically shows the process flow from storage to aerosolation of controlled particles, and FIG. 1C shows state changes in the process from storage to aerosolation of controlled particles. Here, FIGS. 1B and 1C are depicted so as to correspond to the components shown in FIG. 1A.

As shown in FIG. 1A, the composite structure formation system (aerosol deposition apparatus) 100 according to this embodiment includes a storage mechanism 1, a constant supply mechanism 2, a gas supply mechanism 3, an aerosolation mechanism 4, and a discharge port 5.

The constant supply mechanism 2 is provided at the subsequent stage of the storage mechanism 1. The aerosolation mechanism 4 is provided at the subsequent stage of the constant supply mechanism 2, and the discharge port 5 is provided at the subsequent stage of the aerosolation mechanism 4. The gas supply mechanism 3 is connected near the outlet of the constant supply mechanism 2.

The storage mechanism 1 stores controlled particles 31 which are formed in advance. The constant supply mechanism 2 supplies the subsequent aerosolation mechanism 4 with a prescribed quantity of controlled particles 31 stored in the storage mechanism 1 without impairing the shape and state of the controlled particles 31. The constant supply mechanism 2 may be under feedback control as described later so that the supply quantity can be stabilized or varied over time. The controlled particle 31 is described later in detail.

In combination with a gas G supplied by the gas supply mechanism 3, the controlled particles 31 supplied by the constant supply mechanism 2 form a solid-gas mixed phase flow 33, which is supplied to the aerosolation mechanism 4 through a supply channel 16. The supplied controlled particles 31 are disaggregated in the aerosolation mechanism 4, and fine particles 30P are dispersed in the gas G to form an aerosol 32. This aerosol 32 is sprayed from the discharge port 5 toward a substrate, not shown, and a film-like structure (see FIG. 16) is formed on the substrate.

Alternatively, as described later, it is also possible to supply controlled particles 31 to the aerosolation mechanism 4, disaggregate the supplied controlled particles 31 in the aerosolation mechanism 4, and use a gas G supplied from the gas supply mechanism 3 to the aerosolation mechanism 4 to form an aerosol 32 in which fine particles 30P are dispersed in the gas G (see FIG. 15).

However, if the solid-gas mixed phase flow 33 is formed, it serves not only to supply controlled particles 31, but also to accelerate the controlled particles 31 toward the aerosolation mechanism 4. Hence, disaggregation by mechanical impact using the kinetic energy of the accelerated controlled particles 31 facilitates aerosolation.

The gas supply mechanism 3 may be connected to the storage mechanism 1 and the constant supply mechanism 2 to reliably supply controlled particles 31 to the aerosolation mechanism 4, and may be connected to the aerosolation mechanism 4 and the supply channel between the aerosolation mechanism 4 and the discharge port 5, for example, to adjust the fine particle concentration in the aerosol. The connection destination and the combination of connections of the gas supply mechanism 3 can be suitably modified.

Here, the principle of the aerosol deposition method is described.

Fine particles used in the aerosol deposition method are composed primarily of a brittle material. Here, fine particles of a single material property can be used alone, or fine particles having different particle diameters can be mixed.

The fine particle can be illustratively made of a brittle material such as oxides composed primarily of aluminum oxide, titanium oxide, zinc oxide, tin oxide, iron oxide, zirconium oxide, yttrium oxide, chromium oxide, hafnium oxide, beryllium oxide, magnesium oxide, silicon oxide, calcium oxide, lanthanum oxide, strontium oxide, tantalum oxide, barium oxide, cobalt oxide, copper oxide, gadolinium oxide, indium oxide, lithium oxide, molybdenum oxide, manganese oxide, niobium oxide, nickel oxide, osmium oxide, lead oxide, palladium oxide, praseodymium oxide, ruthenium oxide, antimony oxide, scandium oxide, terbium oxide, vanadium oxide, tungsten oxide, ytterbium oxide or the like or composite oxides thereof, diamond, carbides such as boron carbide, silicon carbide, titanium carbide, zirconium carbide, vanadium carbide, niobium carbide, chromium carbide, tungsten carbide, molybdenum carbide, and tantalum carbide, nitrides such as boron nitride, titanium nitride, aluminum nitride, silicon nitride, niobium nitride, and tantalum nitride, boron, borides such as aluminum boride, silicon boride, titanium boride, zirconium boride, vanadium boride, niobium boride, tantalum boride, chromium boride, molybdenum boride, and tungsten boride, or mixtures, multicomponent solid solutions, or compounds thereof, composite oxide-based piezoelectric or pyroelectric ceramics such as barium titanate, lead titanate, lithium titanate, strontium titanate, aluminum titanate, PZT, and PLZT, high-toughness ceramics such as sialon and cermet, biocompatible ceramics such as hydroxyapatite and calcium phosphate, semiconductor materials such as silicon and germanium, and these materials doped with various dopants such as phosphorus, compounds such as gallium arsenide, indium arsenide, cadmium sulfide, and zinc sulfide, or composite materials composed primarily of these materials in combination with a metal or resin.

Furthermore, it is also possible to use a mixture or composite of different kinds of brittle material fine particles. Furthermore, the brittle material fine particles can be mixed with fine particles of a metal material, organic material or the like, or the surface of the brittle material fine particle can be coated therewith. However, even in these cases, the film-like structure is composed primarily of a brittle material.

The gas G can illustratively be air, hydrogen gas, nitrogen gas, oxygen gas, argon gas, helium gas, or other inert gas, or an organic gas such as methane gas, ethane gas, ethylene gas, and acetylene gas, or a corrosive gas such as fluorine gas. Furthermore, a mixed gas thereof may be used as needed.

The process of the aerosol deposition method is typically performed at normal temperature, and characterized, in one aspect, in that a film-like structure can be formed at a temperature sufficiently lower than the melting point of the fine particle material, that is, at several hundred degrees Celsius or less.

In the case where fine particles of a crystalline brittle material are used as a raw material, the film-like structure portion of the composite structure formed by the aerosol deposition method is composed of polycrystals in which the crystal particle size thereof is smaller than that of the raw material fine particle, and the crystal often lacks substantial crystalline orientation. Furthermore, no substantial grain boundary layer made of a glass layer exists at the interface between the brittle material crystals. Furthermore, the film-like structure portion often includes an "anchor layer" which bites into the surface of the substrate. Because of this anchor layer, the film-like structure formed is robustly adhered to the substrate with very high strength.

The film-like structure formed by the aerosol deposition method has sufficient strength, being clearly different from the so-called "green compact" in which fine particles are packed together by pressure and keep shape by physical adhesion.

Here, that incoming brittle material fine particles have deformed or crushed on the substrate in the aerosol deposition method can be verified by measuring the crystallite size of the brittle material fine particle used as a raw material and the formed brittle material structure by X-ray diffractometry and the like.

The crystallite size of the film-like structure formed by the aerosol deposition method is smaller than the crystallite size of the raw material fine particle. Furthermore, a "new surface", where atoms originally located inside the fine particle and bonded to other atoms are exposed, is formed at the "shear surface" and "fracture surface" formed by crush and deformation of the fine particle. It is considered that this new surface, having high surface energy and being active, joins with the surface of an adjacent brittle material fine particle, the new surface of an adjacent brittle material, or the surface of the substrate to form a film-like structure.

Furthermore, if a proper quantity of hydroxy groups exist at the surface of fine particles in the aerosol, it is considered that, at the time of collision of the fine particle, local shear stress and the like between fine particles or between the fine particle and the structure cause mechanochemical acid-base dehydration reaction, which joins them together. It is considered that continuous external application of mechanical impact force successively causes these phenomena, and repeated deformation, fracture and the like of fine particles develop junctions and densify, growing a film-like structure made of the brittle material.

To disaggregate the controlled particle 31 in the aerosolation mechanism 4, mechanical impact force produced by colliding the controlled particle 31 with a wall, protrusion, rotating body or the like is useful. In particular, acceleration in the state of the solid-gas mixed phase flow 33 in which the controlled particles 31 are mixed with a gas G facilitates colliding the controlled particles 31 having some mass with a wall or the like by inertial force. Here, the disaggregation energy depends on the mass and velocity of the controlled particle 31. To gain a velocity required for disaggregation, a pressure difference is required between before and after (inlet side and outlet side) of the aerosolation mechanism 4.

On the basis of the inventors' findings, if the gas used is illustratively one of air, nitrogen, and oxygen, or a mixed gas composed primarily of the aforementioned gas, and the supply quantity of the gas for the minimum cross-sectional area of the supply channel has a volume flow rate of 0.05 L/(min·mm$^2$) or more and 50.0 L/(min·mm$^2$) or less in terms of the value at 1 atmosphere and 25° C., then the controlled particles 31 in the solid-gas mixed phase flow can be efficiently accelerated, and aerosolation can be reliably and readily performed.

Here, in the aerosol deposition method, to produce a film-like structure being homogeneous over a large area and having a uniform thickness, the fine particle concentration in the sprayed aerosol needs to be constantly stable. That is, how to form an aerosol having a stable fine particle concentration is an important technical factor of this method in stabilizing the quality and grade of the film.

In this regard, in the technique as disclosed in Japanese Patent No. 3348154, the state of fine particles stored in the storage mechanism changes over time, for example, which may make it difficult to generate an aerosol having a stable fine particle concentration.

Likewise, in the technique as disclosed in JP-A-2006-200013(Kokai), in the case where submicron or smaller fine particles are used as primary particles, because of their high viscosity and adhesiveness, the problems of adhesion, stacking and the like to the wall surface are likely to occur inside the storage mechanism and in the process of supply from the storage mechanism to the aerosolation mechanism, which may make it difficult to generate an aerosol having a stable fine particle concentration.

Furthermore, also in the technique as disclosed in JP-A-2006-233334(Kokai), which can form an aerosol having the most stable fine particle concentration, the fine particle or the group of fine particles split in a prescribed size and shape may be nonuniform in shape and density when supplied from the storage mechanism or in the process of supply to the aerosolation mechanism. This may make it difficult, although instantaneously, to form an aerosol having a stable fine particle concentration. For example, when supplied from the storage mechanism or in the process of supply to the aerosolation mechanism, the groups of fine particles are partly disaggregated and adhered to the wall surface, which may make it difficult, although instantaneously, to form an aerosol having a stable fine particle concentration.

As a result of studies by the inventors, it has been found that if controlled particles, each being an assembly packed with a plurality of particles including brittle material fine particles having a mean primary particle diameter of 0.1 μm or more and 5 μm or less, are produced in advance and supplied from the storage mechanism to the aerosolation mechanism, then the supply can be made uniform and stable. Furthermore, it has also been found that constant supply capability can be enhanced by intentionally controlling at least one of the bonding strength and shape of the controlled particle.

As described above, the brittle material fine particles having a particle diameter of 0.1 μm or more and 5 μm or less have high aggregability and, if used directly, exhibit very poor handleability. Furthermore, they often form an aggregate particle. Even if such brittle material fine particles are supplied by mechanical means, it is very difficult to ensure constancy of quantity. Hence, in forming an aerosol in the aerosol deposition method, there is a problem of being difficult to ensure temporal uniformity and stability in the aerosol concentration.

In this regard, if controlled particles, each being an assembly packed with a plurality of particles including brittle material fine particles having a mean primary particle diameter of 0.1 μm or more and 5 μm or less, are produced in advance, and fine particles having high viscosity and adhesiveness are accordingly supplied, then disaggregation in the supply process and adhesion, stacking and the like associated therewith can be prevented, and hence constant supply capability can be enhanced. Furthermore, disaggregation can be substantially prevented also in the process of supply from the storage mechanism 1 by the constant supply mechanism 2, and hence constant supply capability can be enhanced.

Furthermore, constant supply capability can be further enhanced by intentionally controlling at least one of the bonding strength and shape of the controlled particle.

Thus, in the aerosolation mechanism 4 provided at the subsequent stage, the fine particle concentration does not significantly vary also in a short period of time, and it is possible to form an aerosol having a fine particle concentration which is uniform over time and stable in a long period of time. Consequently, the quantity of fine particles in the aerosol sprayed from the discharge port can be accurately controlled. Hence, the thickness and quality of the film-like structure formed on the substrate can be precisely controlled.

Next, the inventors' findings about the controlled particle 31 are described.

The mean compressive fracture strength of the controlled particle 31 can serve as an indicator in enhancing constant supply capability, aerosol concentration uniformity and the like.

For example, if the mean compressive fracture strength is too low, when supplied from the storage mechanism 1 or in the process of supply to the aerosolation mechanism 4, the controlled particle 31 is disaggregated and adhered to the wall surface, which may decrease constant supply capability, aerosol concentration uniformity and the like. On the other hand, if the mean compressive fracture strength is too high, although constant supply capability can be ensured, it interferes with disaggregation in the aerosolation mechanism 4, and may decrease aerosol concentration uniformity and the like. Thus, the mean compressive fracture strength of the controlled particle 31 is preferably in a prescribed range.

That is, the controlled particle 31 is assumed to have a mean compressive fracture strength required to substantially avoid disaggregation when supplied from the storage mechanism 1. Furthermore, the controlled particle 31 is assumed to have a mean compressive fracture strength required to substantially avoid disaggregation in the process of supply to the aerosolation mechanism 4, but to be substantially disaggregated in the aerosolation mechanism 4.

The mean compressive fracture strength is calculated as the mean value of compressive fracture strengths measured for a plurality of (e.g., 10 or more) controlled particles 31 which are arbitrarily selected.

Here, the measurement of compressive fracture strength performed by the inventors and the relationship between mean compressive fracture strength and composite structure formation are described.

First, the measurement of compressive fracture strength is described.

Controlled particles including brittle material fine particles with a mean primary particle diameter of approximately 0.3 μm and having a circle-equivalent diameter in the range from 100 to 400 μm were arranged, and measured for compressive fracture strength. The circle-equivalent diameter is described later.

The compressive fracture strength was measured using the Shimadzu micro-compression tester MCT-W201 manufactured by Shimadzu Corporation. The indenter used for measurement was FLAT500. As for the initial condition, the magnification of the objective lens was ×10, the length measurement mode was "single", and the compression ratio for reference strength calculation was 10%. The test mode was "compression test", the test force was 196.1 mN, and the loading speed was 0.9 mN/sec. Thus, the compressive fracture strength was measured for 10 controlled particles 31 which were arbitrarily selected.

The compressive fracture strength was calculated by the following formula from the test force and the particle diameter at the time when the controlled particle was broken by being pressed to the indenter:

$$St = 2.8 P/(\pi \times d \times d)$$

where $St$ is the compressive fracture strength (Pa), $P$ is the test force (N) at the time of compressive fracture, and $d$ is the controlled particle diameter (mm).

FIG. 2 is a graph for illustrating the measurement of compressive fracture strength. The horizontal axis represents displacement, and the vertical axis represents test force.

In this measurement of compressive fracture strength, as shown in FIG. 2, the test force $P$ at the time of compressive fracture was determined to be the point from which the variation in the test force is nearly constant and only the displacement increases. The controlled particle diameter d was measured using the optical instrument provided in the compression tester.

Next, the relationship between mean compressive fracture strength and composite structure formation is described.

Controlled particles having various compressive fracture strengths with a circle-equivalent diameter in the range from 100 to 400 μm were arranged, and used to form a composite structure by the aerosol deposition method. In the apparatus used for the aerosol deposition method, the constant supply mechanism was a vibrating type supplying apparatus, the aerosolation mechanism was based on collision of a solid-gas mixed phase flow with a ceramic plate, and the gas was nitrogen.

The opening of a nozzle serving as the discharge port was 10 mm×0.4 mm, and the gas flow rate of the aerosol squirted from the opening was 5 L/min. The substrate for forming a composite structure thereon was a plate of SUS304 stainless steel. The stroke for reciprocating the substrate was 10 mm, and the time for forming a composite structure on a 10 mm×10 mm surface (aerosol spraying time) was 10 minutes.

Figure 3:
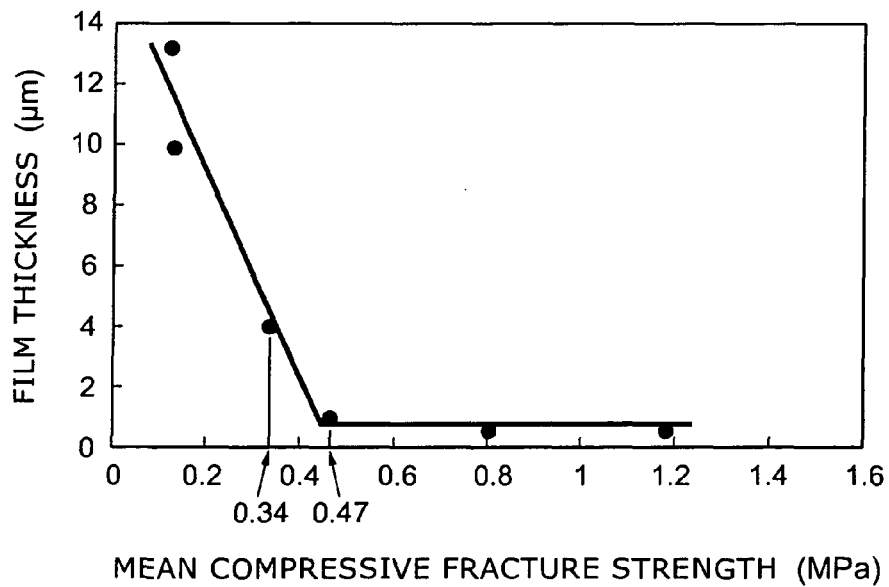
FIG. 3 is a graph for illustrating the relationship between mean compressive fracture strength and composite structure formation.

FIG. 3 is a graph for illustrating the relationship between mean compressive fracture strength and composite structure formation. The horizontal axis represents mean compressive fracture strength, and the vertical axis represents the thickness of the film-like structure.

As seen from FIG. 3, at mean compressive fracture strength exceeding 0.47 MPa, it is only possible to form thin films, causing a problem with productivity. This is presumably because the excessively high compressive fracture strength of the controlled particle interferes with disaggregation of the controlled particle in the aerosolation mechanism. On the basis of the inventors' findings, a mean compressive fracture strength of 0.47 MPa or less enables composite structure formation which is preferable from the viewpoint of productivity. Furthermore, a mean compressive fracture strength of 0.34 MPa or less enables composite structure formation which is more preferable from the viewpoint of productivity.

The foregoing relates to the upper bound of the mean compressive fracture strength. As seen from FIG. 3, a thick film can be formed in a shorter period of time as the mean compressive fracture strength becomes lower. Hence, the lower bound cannot be determined from the viewpoint of productivity.

As described above, the lower bound of the mean compressive fracture strength is determined primarily from the viewpoint of constant supply capability. More specifically, if the mean compressive fracture strength is too low, when supplied from the storage mechanism or in the process of supply to the aerosolation mechanism 4, even under the condition for gentle feed, the controlled particle may be disaggregated, or part of the brittle material fine particles constituting the controlled particle may drop off from the surface, in response to various forces generated during the migration of particles, such as friction between controlled particles, contact stress therebetween, and friction with the wall surface. If the brittle material fine particles resulting from disaggregation and drop-off are adhered to the wall surface, migration of controlled particles is prevented, and constant supply capability is impaired. Hence, the mean compressive fracture strength is preferably above a prescribed value.

As a result of detailed studies on, for example, the types of the constant supply mechanism 2 (e.g., sieve shaking type, supplying type based on a turntable, supplying type based on supersonic vibration or electromagnetic vibration, screw feeder, electrostatic supplying type, etc.) and the supply condition in the supply channel 16 and the like, the inventors have found that the mean compressive fracture strength is preferably 0.015 MPa or more from the viewpoint of constant supply capability.

Thus, the mean compressive fracture strength is preferably 0.46 MPa or less, and more preferably 0.34 MPa or less. Furthermore, the mean compressive fracture strength is preferably 0.015 MPa or more.

Furthermore, the mean circle-equivalent diameter of the controlled particle 31 can serve as an indicator in enhancing constant supply capability, aerosol concentration uniformity and the like.

For example, if the mean circle-equivalent diameter is too small, aggregation is more likely to occur, which may impair constant supply capability, aerosol concentration uniformity and the like. On the other hand, if the mean circle-equivalent diameter is too large, clogging in the supply channel 16 and the like and disaggregation failure in the aerosolation mechanism 4 may occur. Thus, the mean circle-equivalent diameter of the controlled particle 31 is preferably in a prescribed range.

Here, the circle-equivalent diameter refers to the diameter of an equivalent circle having an area equal to the area of the controlled particle 31 based on image analysis. The circle-equivalent diameter can be calculated by analyzing the optical micrograph or the like of the controlled particle 31 using commercially available shape analysis software. Such software illustratively includes analysis software (WinROOF manufactured by Mitani Corporation) incorporated in a polarization optical microscope (LV-IMA manufactured by Nikon Corporation).

The mean circle-equivalent diameter is calculated as the mean value of circle-equivalent diameters measured for a plurality of controlled particles which are arbitrarily selected. In the calculation, first, a silicon wafer or the like, which has a mirror surface free from flaws resulting in noise, is prepared as a substrate for spreading controlled particles thereon. Next, prepared fine particles to be measured on the photographic determination image are scattered thereon. Here, they are scattered so that their area ratio occupying the photographic determination image is 40% or less. Then, aggregate particles and primary particles which are not characterized as controlled particles, and groups of particles observed in the overlapping state of a plurality of primary particles, are excluded as much as possible. The scattered condition of avoiding mutual overlap is ensured particularly for fine particles around the center particle diameter. In photographic determination, the group of data for controlled particles with poor constant supply capability measured at a mean circle-equivalent diameter of 5 μm or less, which is of course determined to be insufficient for the controlled particle, is deleted. In the photographic determination image, the data of particles in contact with the outer peripheral boundary of the image, that is, the data of particles which are not completely captured in the image, are also deleted to ensure reliability in the value.

Figure 4:
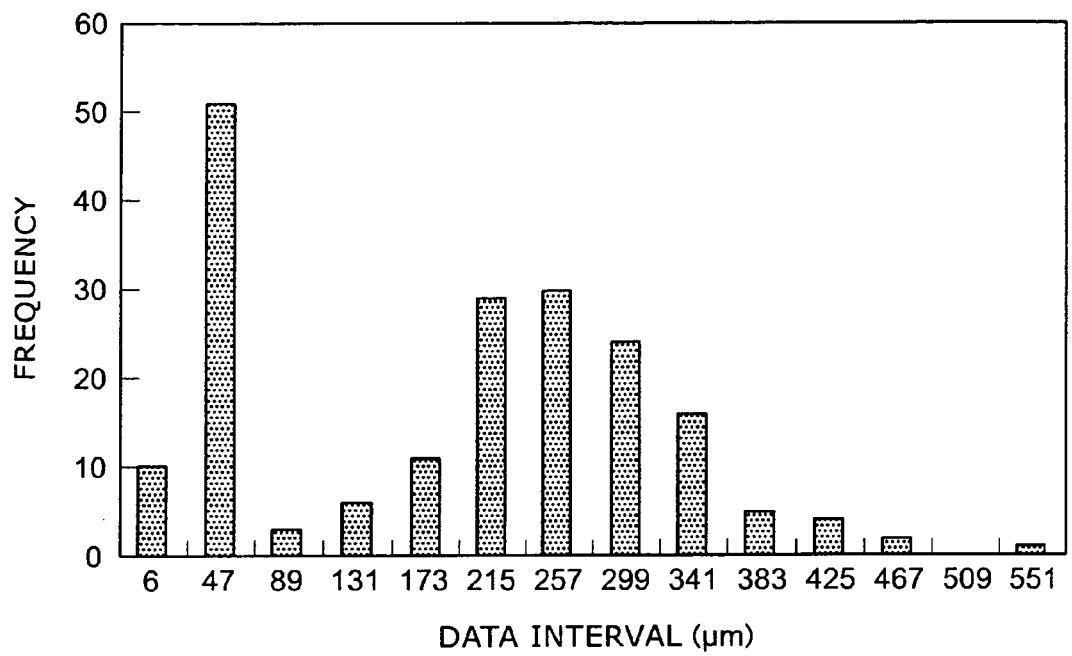
FIG. 4 is a graph for illustrating the histogram in the distribution of controlled particles.

Furthermore, for example, as shown in FIG. 4, the distribution of controlled particles having an observed mean circle-equivalent diameter of 5 μm or more is evenly divided between the minimum diameter and the maximum diameter into 10 to 20 data intervals to create a histogram. Here, in the case where there is a peak at a value of 100 μm or more and there is another peak at a value of 30 μm or less, it is known that these particles with 30 μm or less hardly affect the supply quantity standard deviation even if they account for up to approximately 80% in number frequency. This is presumably because constant supply capability is governed by relatively large controlled particles, which account for a large proportion in terms of volume.

It is considered that such microparticles include fragments formed by partly dropping off from controlled particles and those being incomplete in controlled particle formation. Thus, if the distribution can be clearly determined to have a peak of controlled particles having a large particle diameter, which are targeted for calculation, in combination with another peak of microparticles out of the calculation target, then in determining a mean circle-equivalent diameter, the group of particles constituting the peak of microparticles is excluded to calculate a mean circle-equivalent diameter.

Preferably, by such careful selection operation, 150 to 200 controlled particles to be counted are selected, and their numerical values are used to determine a mean circle-equivalent diameter.

In the case where the aforementioned analysis software (WinROOF manufactured by Mitani Corporation), for example, is used in photographic determination, light is projected so as to ensure sufficient contrast between the substrate and the particle to be observed. After a sufficient contrast is achieved and the focus is adjusted, a photograph is taken. The photograph taken is turned into a monochrome image and digitized.

Digitization needs care because improper setting of its threshold results in an erroneous value. In particular, it has significant influence on whether particles having a true circle-equivalent diameter of approximately 20 μm or less are selected for measurement. This also causes significant variation in the mean circle-equivalent diameter as well as the D10 value and the value of the particle size distribution deviation ratio described later.

Hence, in digitization, an approximate midpoint between the peak on the substrate side (typically on the white side) and the peak on the particle side (typically on the black side) in the monochrome image is preferably selected as a threshold.

Despite such threshold selection, a plurality of peaks may often occur in the aforementioned calculated value of the mean circle-equivalent diameter. This requires the selection operation on the count of particles as described above.

In evaluating constant supply capability, first, controlled particles including brittle material fine particles with a mean primary particle diameter of approximately 0.3 μm and being in the aforementioned range of mean compressive fracture strength were arranged, and sorted by mean circle-equivalent diameters. Then, by the following method, constant supply capability of the controlled particles for each mean circle-equivalent diameter was evaluated.

To evaluate constant supply capability, a vibrating type supplying apparatus was used. The supply rate was 5 g/min, the supply time was 30 minutes, and the weight of controlled particles supplied from the vibrating type supplying apparatus was measured using an electronic balance. The measurement resolution of the electronic balance was 0.01 g. The temporal supply quantity was measured at every 5 seconds, and supply quantity data from after 2 minutes to after 30 minutes were used to determine the supply quantity and the standard deviation of the supply quantity. Here, as a result of detailed observation on the supplying state and the like, constant supply capability was determined as good in the case where the supply quantity standard deviation was 0.01 or less. Hence, the supply quantity standard deviation 0.01 was adopted as a pass/fail criterion.

Figure 5:
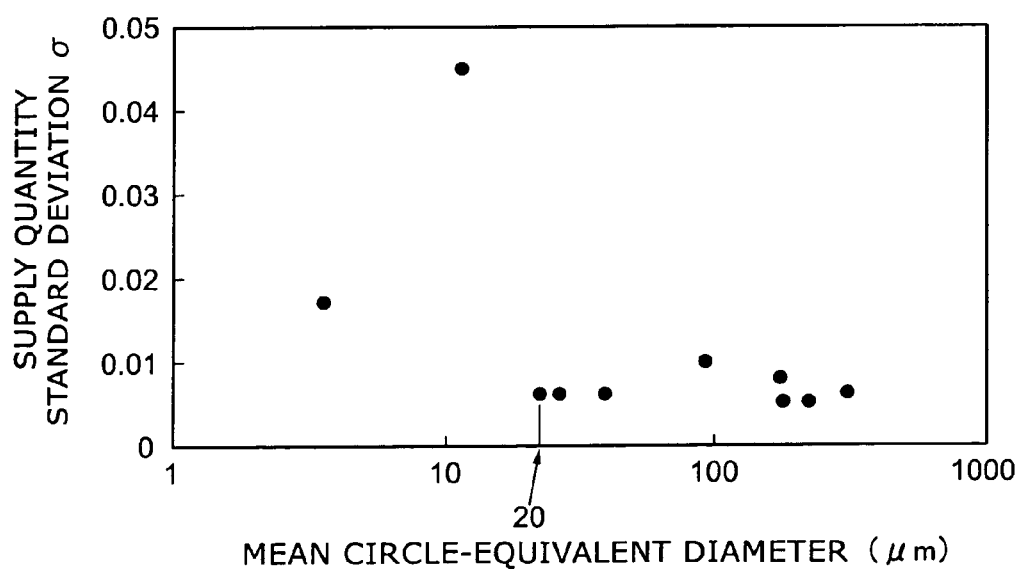
FIG. 5 is a graph for illustrating the relationship between a mean circle-equivalent diameter and supply quantity standard deviation.

FIG. 5 is a graph for illustrating the relationship between mean circle-equivalent diameter and supply quantity standard deviation. The horizontal axis represents mean circle-equivalent diameter, and the vertical axis represents supply quantity standard deviation.

As seen from FIG. 5, if the mean circle-equivalent diameter is 20 μm or more, the supply quantity standard deviation is 0.01 or less, exhibiting good constant supply capability. On the other hand, if the mean circle-equivalent diameter is less than 20 μm, the supply quantity is unstable over time, impairing constant supply capability.

The foregoing relates to the lower bound of the mean circle-equivalent diameter. As seen from FIG. 5, even if the mean circle-equivalent diameter increases, constant supply capability is not impaired. Hence, the upper bound cannot be determined by the evaluation using the vibrating type supplying apparatus.

As described above, the upper bound of the mean circle-equivalent diameter can be determined primarily from the viewpoint of clogging in the supply channel 16 and the like and the occurrence of disaggregation failure in the aerosolation mechanism 4. More specifically, if the mean circle-equivalent diameter is too large, during supply from the storage mechanism or in the process of supply to the aerosolation mechanism 4, clogging and the like occur and impair constant supply capability. Furthermore, disaggregation in the aerosolation mechanism 4 also produces fragments which are not disaggregated to primary particles. Such fragments do not contribute to the formation of a film-like structure, and consequently impairs aerosol concentration uniformity.

As a result of detailed studies on, for example, the supply condition in the supply channel 16 and the like and the disaggregation condition in the aerosolation mechanism 4, the inventors have found that the mean circle-equivalent diameter is preferably 500 µm or less.

Thus, the mean circle-equivalent diameter is preferably 20 µm or more and 500 µm or less.

Furthermore, the mean circularity of the controlled particle 31 can serve as an indicator in enhancing constant supply capability, aerosol concentration uniformity and the like.

For example, if the mean circularity is too small, rolling is made difficult, which interferes with smooth supply. This may impair constant supply capability, aerosol concentration uniformity and the like. Hence, the mean circularity of the controlled particle 31 is preferably above a prescribed value.

Here, the circularity is determined by the following formula, and can be calculated by analyzing the optical micrograph or the like of the controlled particle 31 using commercially available shape analysis software. Such software illustratively includes analysis software (WinROOF manufactured by Mitani Corporation) incorporated in a polarization optical microscope (LV-IMA manufactured by Nikon Corporation).

$$\text{Circularity} = 4\pi \times (\text{area of the controlled particle in the image})/(\text{perimeter of the controlled particle in the image})^2$$

Here, the circularity is equal to 1 for a perfect circle. That is, the maximum circularity is equal to 1.

The mean circularity is calculated as the mean value of circularities measured for a plurality of controlled particles which are arbitrarily selected. In the calculation, aggregate particles and primary particles which are not characterized as controlled particles, and groups of particles observed in the overlapping state of a plurality of primary particles, are excluded. Specifically, in photographic determination, the group of data measured at a mean circle-equivalent diameter of 5 µm or less is deleted. In the photographic determination image, the data of particles in contact with the outer peripheral boundary of the image, that is, the data of particles which are not completely captured in the image, are also deleted to ensure reliability in the value.

Here, the number of counts of controlled particles used for calculation is preferably 150 to 200. Furthermore, if the particle size distribution has a high frequency at 30 µm or less, it is preferably treated similarly to the aforementioned calculation of mean circle-equivalent diameter. In the case where the analysis software (WinROOF manufactured by Mitani Corporation) is used, data for mean circle-equivalent diameter and circularity can be simultaneously collected.

In evaluating constant supply capability, first, controlled particles including brittle material fine particles with a mean primary particle diameter of approximately 0.3 µm and being in the aforementioned range of mean compressive fracture strength were arranged, and sorted by mean circularities. Then, by the following method, constant supply capability of the controlled particles for each mean circularity was evaluated.

To evaluate constant supply capability, a vibrating type supplying apparatus was used. The supply rate was 5 g/min, the supply time was 30 minutes, and the weight of controlled particles supplied from the vibrating type supplying apparatus was measured using an electronic balance. The measurement resolution of the electronic balance was 0.01 g. The temporal supply quantity was measured at every 5 seconds, and supply quantity data from after 2 minutes to after 30 minutes were used to determine the supply quantity and the standard deviation of the supply quantity. Here, as a result of detailed observation on the supplying state and the like, constant supply capability was determined as good in the case where the supply quantity standard deviation was 0.01 or less. Hence, the supply quantity standard deviation 0.01 was adopted as a pass/fail criterion.

Figure 6:
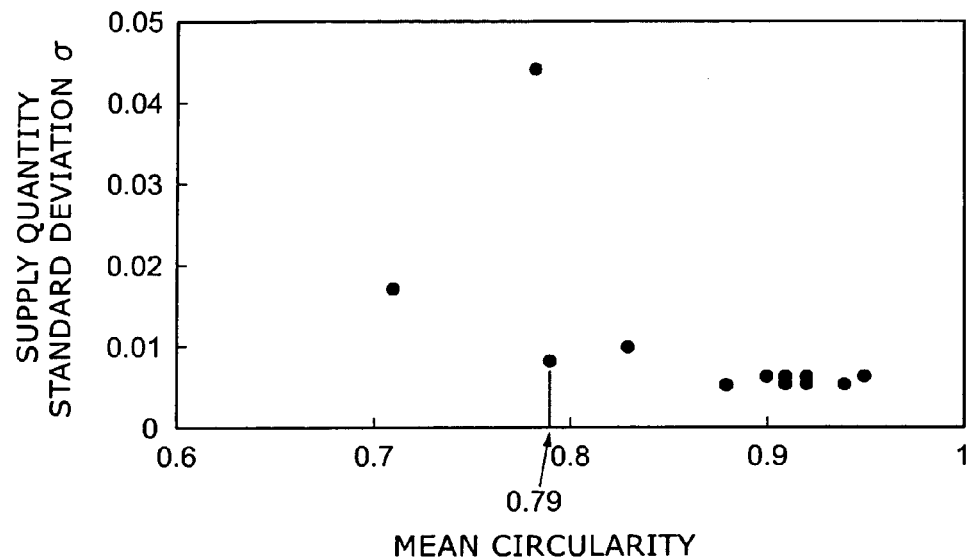
FIG. 6 is a graph for illustrating the relationship between mean circularity and supply quantity standard deviation.

FIG. 6 is a graph for illustrating the relationship between mean circularity and supply quantity standard deviation. The horizontal axis represents mean circularity, and the vertical axis represents supply quantity standard deviation.

As seen from FIG. 6, if the mean circularity is 0.79 or more, the supply quantity standard deviation is 0.01 or less, exhibiting good constant supply capability. On the other hand, if the mean circularity is less than 0.79, the supply quantity is unstable over time, which may impair constant supply capability.

The foregoing relates to the lower bound of the mean circularity. As seen from FIG. 6, even if the mean circularity increases, constant supply capability is not impaired. Hence, the upper bound of the mean circularity can be set to 1 (perfect circle).

Thus, the mean circularity is preferably 0.79 or more.

Next, evaluation of constant supply capability for a shorter period of time is illustrated.

In this evaluation of constant supply capability, first, a plurality of controlled particles including brittle material fine particles with a mean primary particle diameter in the submicron range were arranged, and measured for circularity. Then, by the following method, constant supply capability of the controlled particles for each circularity was evaluated.

To evaluate constant supply capability, a vibrating type supplying apparatus was used. The supply rate was set to 0.5 g/min and 5 g/min, and the supply time was up to 3 minutes. For every 0.1 seconds at 0.5 g/min and for every 1 second at 5 g/min, the flow rate was measured from the 0.1-second weight variation of the controlled particles supplied from the vibrating type supplying apparatus. The mean value of this flow rate was calculated, and the standard deviation thereof was determined.

Figure 7:
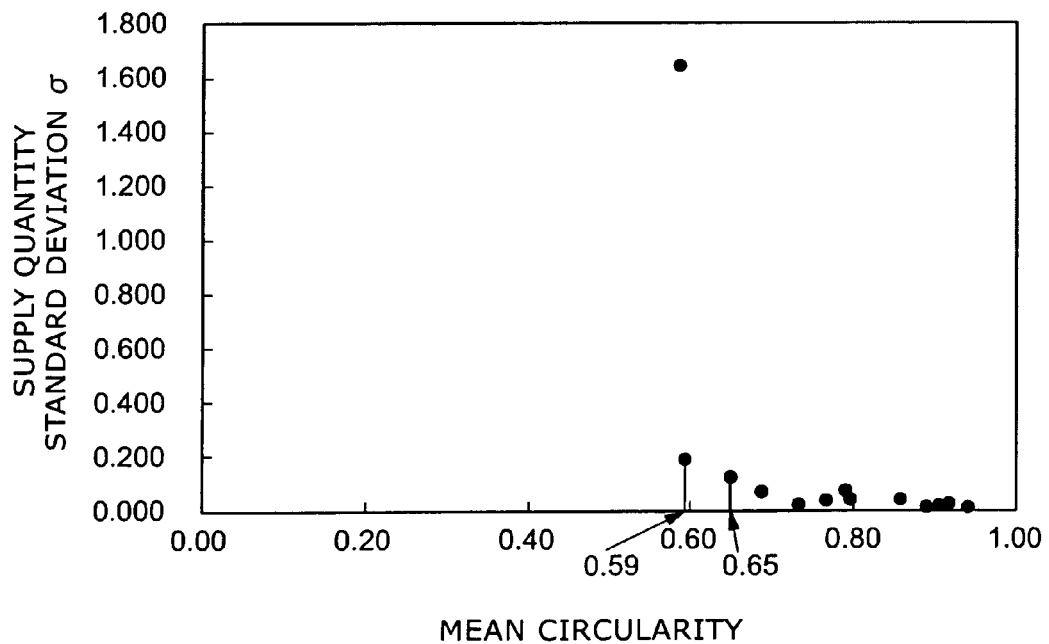
FIG. 7 is a graph for illustrating the relationship between mean circularity and supply quantity standard deviation in the case where the supply rate is 0.5 g/min.

FIG. 7 is a graph for illustrating the relationship between mean circularity and supply quantity standard deviation in the case where the supply rate is 0.5 g/min.

Figure 8:
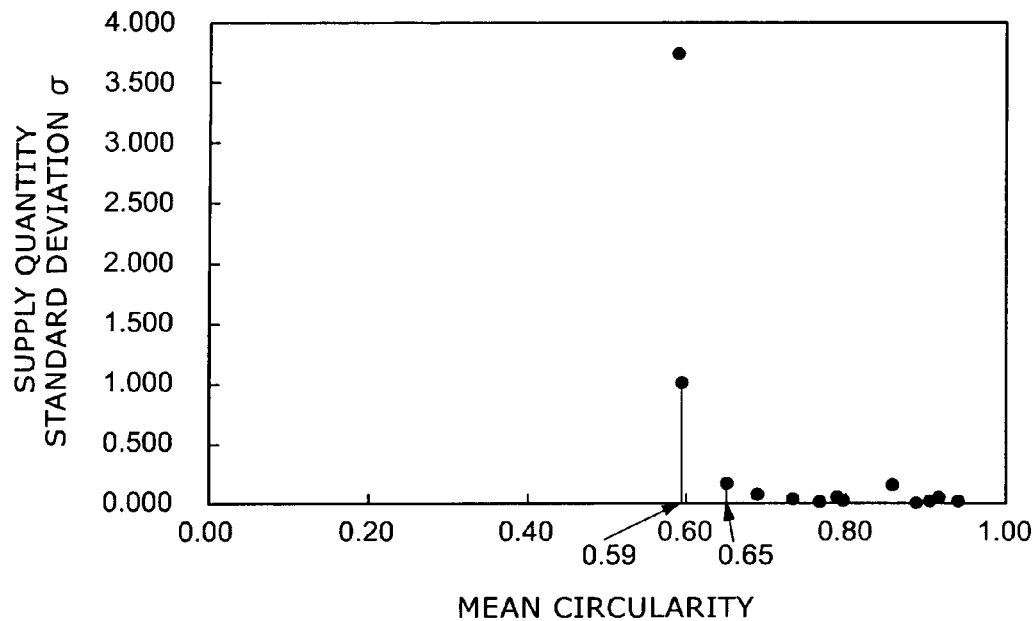
FIG. 8 is a graph for illustrating the relationship between mean circularity and supply quantity standard deviation in the case where the supply rate is 5 g/min.

FIG. 8 is a graph for illustrating the relationship between mean circularity and supply quantity standard deviation in the case where the supply rate is 5 g/min.

In FIGS. 7 and 8, the horizontal axis represents mean circularity, and the vertical axis represents supply quantity standard deviation.

In this case, constant supply capability was determined as very excellent for a supply quantity standard deviation of 0.122 or less in FIG. 7 and 0.178 or less in FIG. 8.

Thus, as seen from FIGS. 7 and 8, if the mean circularity is 0.65 or more, the supply quantity is stable. On the other hand, if the mean circularity is 0.59 or less, the supply quantity is unstable over time, impairing constant supply capability. Furthermore, also in the case where the supply rate exceeds 5 g/min, the stability of the supply quantity exhibited the same tendency.

Furthermore, the D10 value of the controlled particle 31 can serve as an indicator in enhancing constant supply capability, aerosol concentration uniformity and the like.

For example, if the D10 value is too small (if the particle diameter of the particle located at 10% from the smallest particle in the particle size distribution of controlled particles is too small), adhesion and the like are likely to occur, which interferes with smooth supply. This may impair constant supply capability, aerosol concentration uniformity and the like. Hence, the D10 value of the controlled particle 31 is preferably above a prescribed value.

Here, the D10 value refers to a particle diameter of the particle located at 10% from the smallest particle (10% from the bottom) in the particle size distribution of controlled particles. In determining the D10 value, a plurality of controlled particles are arbitrarily selected, and sorted in the ascending order of the circle-equivalent diameter, and the particle diameter of the particle located nearest to 10% from the smallest particle can be used as the D10 value. Here, the number of counts of controlled particles used for calculation is preferably 150 to 200. The primary particle diameter of the brittle material fine particle is limited in the range from 0.1 to 5 μm, and depending on the primary particle diameter of the brittle material, aggregate particles and primary particles which are not characterized as controlled particles, and groups of particles observed in the overlapping state of a plurality of primary particles, are excluded. Specifically, in photographic determination, the group of data measured at a mean circle-equivalent diameter of 5 μm or less is deleted. In the photographic determination image, the data of particles in contact with the outer peripheral boundary of the image, that is, the data of particles which are not completely captured in the image, are also deleted to ensure reliability in the value.

Furthermore, if the particle size distribution has a high frequency at 30 μm or less, it is preferably treated similarly to the aforementioned calculation of mean circle-equivalent diameter. In the case where the analysis software (WinROOF manufactured by Mitani Corporation) is used, data for mean circle-equivalent diameter and D10 value can be simultaneously collected.

Here, the D10 value can be calculated by analyzing the optical micrograph or the like of the controlled particle 31 using commercially available shape analysis software. Such software illustratively includes analysis software (WinROOF manufactured by Mitani Corporation) incorporated in a polarization optical microscope (LV-IMA manufactured by Nikon Corporation).

In evaluating constant supply capability, first, controlled particles including brittle material fine particles with a mean primary particle diameter of approximately 0.3 μm and being in the aforementioned range of mean compressive fracture strength were arranged, and sorted by D10 values. Then, by the following method, constant supply capability of the controlled particles for each D10 value was evaluated.

To evaluate constant supply capability, a vibrating type supplying apparatus was used. The supply rate was 5 g/min, the supply time was 30 minutes, and the weight of controlled particles supplied from the vibrating type supplying apparatus was measured using an electronic balance. The measurement resolution of the electronic balance was 0.01 g. The temporal supply quantity was measured at every 5 seconds, and supply quantity data from after 2 minutes to after 30 minutes were used to determine the supply quantity and the standard deviation of the supply quantity. Here, as a result of detailed observation on the supplying state and the like, constant supply capability was determined as good in the case where the supply quantity standard deviation was 0.01 or less. Hence, the supply quantity standard deviation 0.01 was adopted as a pass/fail criterion.

Figure 9:
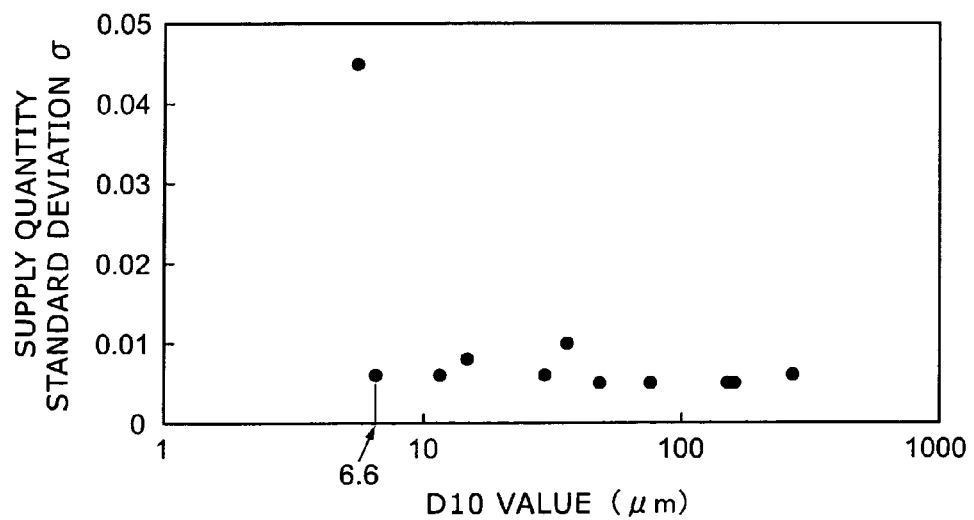
FIG. 9 is a graph for illustrating the relationship between D10 value and supply quantity standard deviation.

FIG. 9 is a graph for illustrating the relationship between D10 value and supply quantity standard deviation. The horizontal axis represents D10 value, and the vertical axis represents supply quantity standard deviation.

As seen from FIG. 9, if the D10 value is 6.6 μm or more, the supply quantity standard deviation is 0.01 or less, exhibiting good constant supply capability. On the other hand, if the D10 value is less than 6.6 μm, the supply quantity is unstable over time, impairing constant supply capability.

The foregoing relates to the lower bound of the D10 value. As seen from FIG. 9, even if the D10 value increases, constant supply capability is not impaired. Hence, the upper bound of the D10 value is not particularly limited, but actually, equal to or less than the mean circle-equivalent diameter of the controlled particles. Hence, the D10 value is 500 μm or less.

Thus, the D10 value is preferably 6.6 μm or more.

Furthermore, the particle size distribution deviation ratio of the controlled particle 31 can serve as an indicator in enhancing constant supply capability, aerosol concentration uniformity and the like.

For example, if the particle size distribution deviation ratio is too large, that is, if the particle size distribution is too broad, smooth supply is made difficult. This may impair constant supply capability, aerosol concentration uniformity and the like. Hence, the particle size distribution deviation ratio of the controlled particle 31 is preferably below a prescribed value.

The particle size distribution deviation ratio is calculated as (standard deviation a of circle-equivalent diameter)/(mean circle-equivalent diameter). The particle size distribution deviation ratio can be determined by arbitrarily selecting a plurality of controlled particles, measuring their circle-equivalent diameters, determining the mean value and standard deviation a of the circle-equivalent diameters, and calculating (standard deviation a of circle-equivalent diameter)/(mean circle-equivalent diameter). Here, the number of counts of controlled particles used for calculation is preferably 150 to 200. The value of the particle size distribution deviation ratio ranges from 0 to 1, and the value closer to 0 indicates that the controlled particles have a narrower particle size distribution and are more uniform in particle diameter.

The particle size distribution deviation ratio can be calculated by analyzing the optical micrograph or the like of the controlled particle 31 using commercially available shape analysis software. Such software illustratively includes analysis software (WinROOF manufactured by Mitani Corporation) incorporated in a polarization optical microscope (LV-IMA manufactured by Nikon Corporation). In the calculation, aggregate particles and primary particles which are not characterized as controlled particles, and groups of particles observed in the overlapping state of a plurality of primary particles, are excluded. Specifically, in photographic determination, the group of data measured at a mean circle-equivalent diameter of 5 μm or less is deleted. In the photographic determination image, the data of particles in contact with the outer peripheral boundary of the image, that is, the data of particles which are not completely captured in the image, are also deleted to ensure reliability in the value.

Furthermore, if the particle size distribution has a high frequency at 30 μm or less, it is preferably treated similarly to the aforementioned calculation of mean circle-equivalent diameter.

In evaluating constant supply capability, first, controlled particles including brittle material fine particles with a mean primary particle diameter of approximately 0.3 μm and being in the aforementioned range of mean compressive fracture strength were arranged, and sorted by particle size distribution deviation ratios. Then, by the following method, constant supply capability of controlled particles for each particle size distribution deviation ratio was evaluated.

To evaluate constant supply capability, a vibrating type supplying apparatus was used. The supply rate was 5 g/min, the supply time was 30 minutes, and the weight of controlled particles supplied from the vibrating type supplying apparatus was measured using an electronic balance. The measurement resolution of the electronic balance was 0.01 g. The temporal supply quantity was measured at every 5 seconds, and supply quantity data from after 2 minutes to after 30 minutes were used to determine the supply quantity and the standard deviation of the supply quantity. Here, as a result of detailed observation on the supplying state and the like, constant supply capability was determined as good in the case where the supply quantity standard deviation was 0.01 or less. Hence, the supply quantity standard deviation 0.01 was adopted as a pass/fail criterion.

Figure 10:
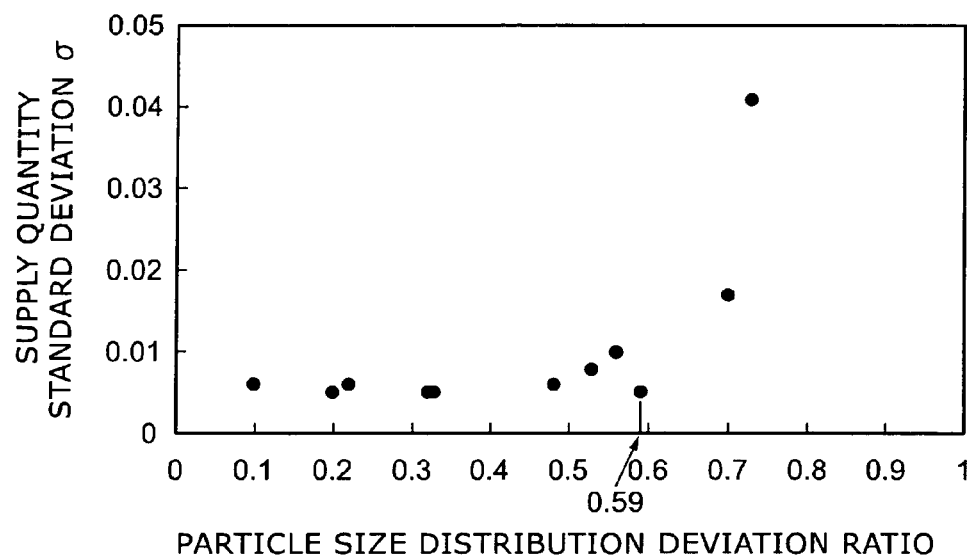
FIG. 10 is a graph for illustrating the relationship between particle size distribution deviation ratio and supply quantity standard deviation.
Figure 11:
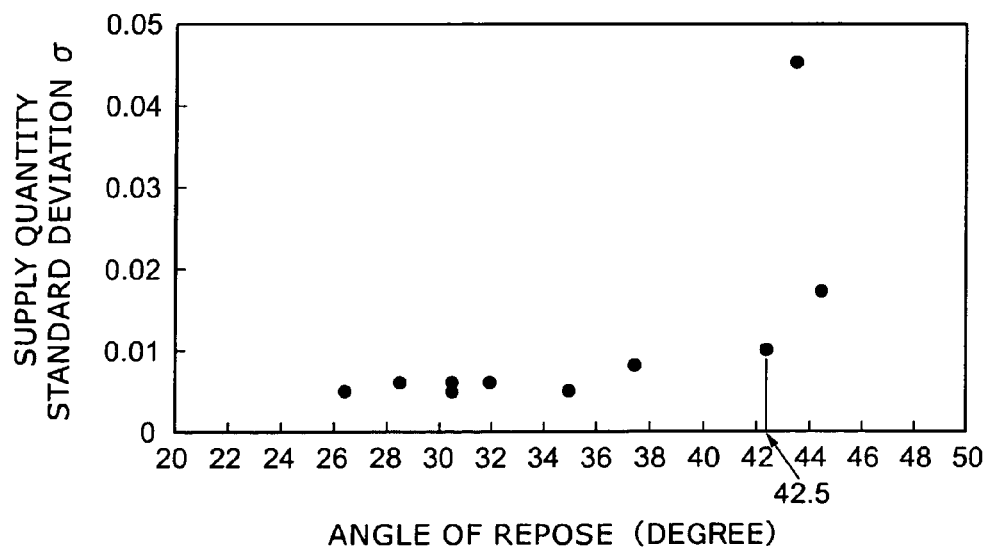
FIG. 11 is a graph for illustrating the relationship between angle of repose and supply quantity standard deviation.

FIG. 10 is a graph for illustrating the relationship between particle size distribution deviation ratio and supply quantity standard deviation. The horizontal axis represents particle size distribution deviation ratio, and the vertical axis represents supply quantity standard deviation.

As seen from FIG. 10, if the particle size distribution deviation ratio is 0.59 or less, the supply quantity standard deviation is 0.01 or less, exhibiting good constant supply capability. On the other hand, if the particle size distribution deviation ratio exceeds 0.59, the supply quantity is unstable over time, impairing constant supply capability.

The foregoing relates to the upper bound of the particle size distribution deviation ratio. As seen from FIG. 10, even if the particle size distribution deviation ratio decreases, constant supply capability is not impaired. Hence, the lower bound of the particle size distribution deviation ratio is not particularly limited.

Thus, the particle size distribution deviation ratio is preferably 0.59 or less.

Furthermore, the angle of repose of the controlled particle 31 can serve as an indicator in enhancing constant supply capability, aerosol concentration uniformity and the like.

For example, if the angle of repose is too large, that is, if flow is less likely to occur, smooth supply is made difficult. This may impair constant supply capability, aerosol concentration uniformity and the like. Hence, the angle of repose of the controlled particle 31 is preferably below a prescribed value.

Figure 12:
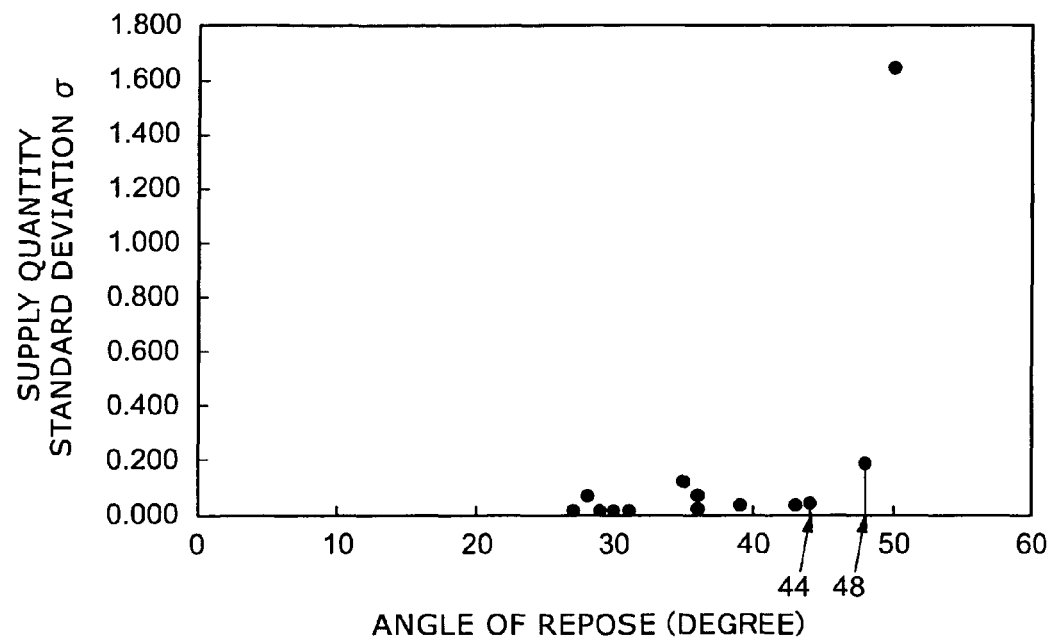
FIG. 12 is a graph for illustrating the relationship between angle of repose and supply quantity standard deviation in the case where the supply rate is 0.5 g/min.
Figure 13:
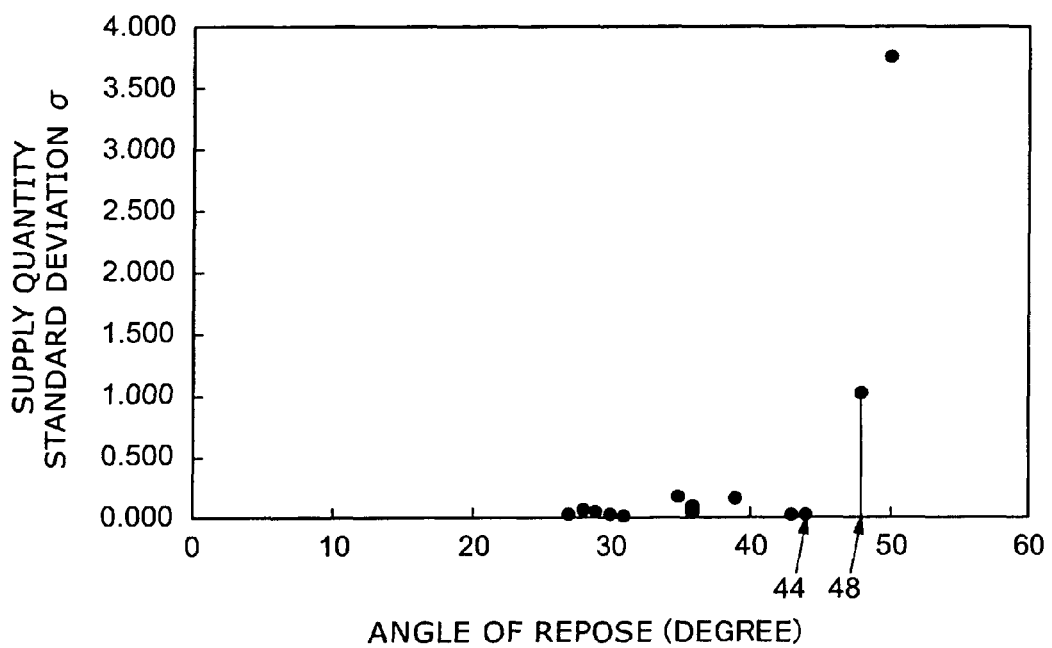
FIG. 13 is a graph for illustrating the relationship between angle of repose and supply quantity standard deviation in the case where the supply rate is 5 g/min.
Figure 15A:
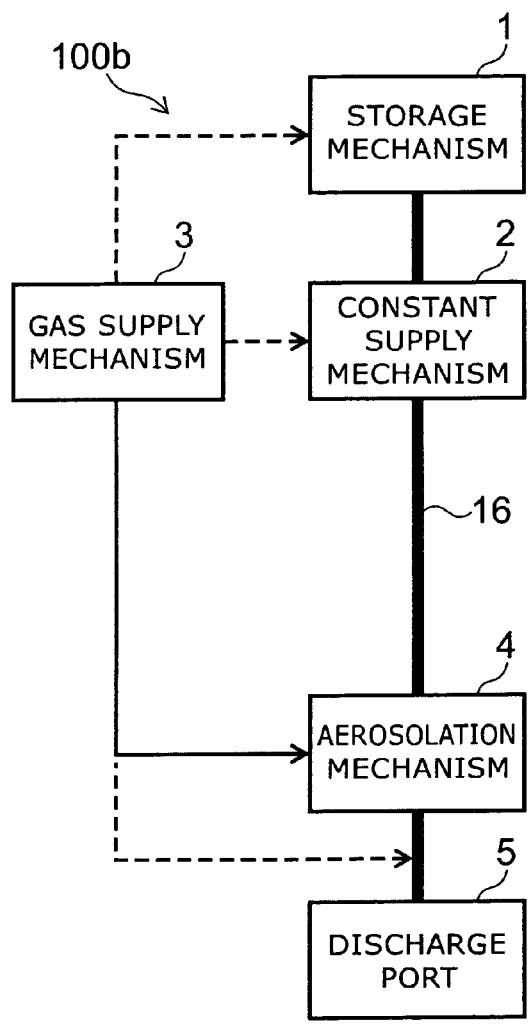
FIGS. 15A to 15C are schematic views for illustrating the basic configuration of a composite structure formation system according to a third embodiment of the invention.
Figure 15B:
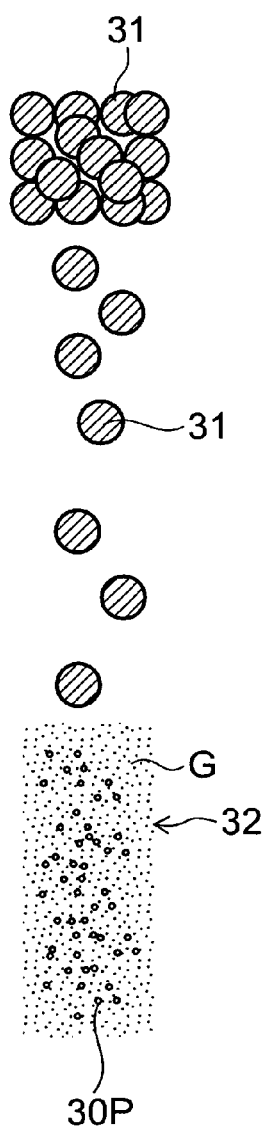
Figure 15C:
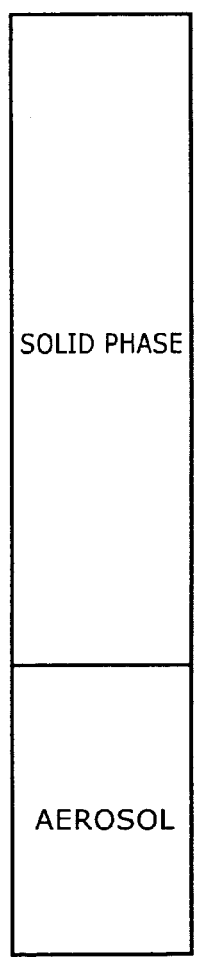

The angle of repose was determined as follows. First, controlled particles are dropped in small quantities with a rate of 5 g/min or less toward the center of a disk having a diameter of 30 mm, and piled up until the controlled particles begin to spill from the disk. Then, for example, a photograph was taken sideways. By image analysis, in the photograph of the conical pile of controlled particles, the angles between the bottom side and the left and right slope were measured, and the mean value of the angles was calculated to determine the angle of repose.

In evaluating constant supply capability, first, controlled particles including brittle material fine particles with a mean primary particle diameter of approximately 0.3 μm and being in the aforementioned range of mean compressive fracture strength were arranged, and sorted by angles of repose. Then, by the following method, constant supply capability of the controlled particles for each angle of repose was evaluated.

To evaluate constant supply capability, a vibrating type supplying apparatus was used. The supply rate was 5 g/min, the supply time was 30 minutes, and the weight of controlled particles supplied from the vibrating type supplying apparatus was measured using an electronic balance. The measurement resolution of the electronic balance was 0.01 g. The temporal supply quantity was measured at every 5 seconds, and supply quantity data from after 2 minutes to after 30 minutes were used to determine the supply quantity and the standard deviation of the supply quantity. Here, as a result of detailed observation on the supplying state and the like, constant supply capability was determined as good in the case where the supply quantity standard deviation was 0.01 or less. Hence, the supply quantity standard deviation 0.01 was adopted as a pass/fail criterion.

FIG. 11 is a graph for illustrating the relationship between angle of repose and supply quantity standard deviation. The horizontal axis represents angle of repose, and the vertical axis represents supply quantity standard deviation.

As seen from FIG. 11, if the angle of repose is 42.5 degrees or less, the supply quantity standard deviation is 0.01 or less, exhibiting good constant supply capability. On the other hand, if the angle of repose exceeds 42.5 degrees, the supply quantity is unstable over time, which may impair constant supply capability.

The foregoing relates to the upper bound of the angle of repose. As also seen from FIG. 11, even if the angle of repose decreases, constant supply capability is not impaired. Hence, the lower bound of the angle of repose is not particularly limited. That is, the angle of repose only needs to exceed 0 degrees.

Thus, the angle of repose is preferably 42.5 degrees or less.

Next, evaluation of constant supply capability for a shorter period of time is illustrated.

In this evaluation of constant supply capability, first, a plurality of controlled particles including brittle material fine particles with a mean primary particle diameter in the submicron range were arranged, and measured for angle of repose. Then, by the following method, constant supply capability of the controlled particles for each angle of repose was evaluated.

To evaluate constant supply capability, a vibrating type supplying apparatus was used. The supply rate was set to 0.5 g/min and 5 g/min, and the supply time was up to 3 minutes. For every 0.1 seconds at 0.5 g/min and for every 1 second at 5 g/min, the flow rate was measured from the 0.1-second weight variation of the controlled particles supplied from the vibrating type supplying apparatus. The mean value of this flow rate was calculated, and the standard deviation thereof was determined.

FIG. 12 is a graph for illustrating the relationship between angle of repose and supply quantity standard deviation in the case where the supply rate is 0.5 g/min.

FIG. 13 is a graph for illustrating the relationship between angle of repose and supply quantity standard deviation in the case where the supply rate is 5 g/min.

In FIGS. 12 and 13, the horizontal axis represents angle of repose, and the vertical axis represents supply quantity standard deviation.

In this case, constant supply capability was determined as excellent for a supply quantity standard deviation of 0.192 or less in FIG. 12 and 1.018 or less in FIG. 13. Furthermore, constant supply capability was determined as very excellent for a supply quantity standard deviation of 0.122 or less in FIG. 12 and 0.178 or less in FIG. 13.

Thus, as seen from FIGS. 12 and 13, if the angle of repose is 48° or less, a high constant supply capability is achieved. Furthermore, if the angle of repose is 44° or less, the supply quantity standard deviation is especially small, and hence the constant supply capability is more excellent. On the other hand, if the angle of repose exceeds 48°, the supply quantity is unstable over time, impairing constant supply capability. Furthermore, also in the case where the supply rate exceeds 5 g/min, the stability of the supply quantity exhibited the same tendency.

Furthermore, in the case of using controlled particles having an angle of repose of 48° or less, the quantity of brittle material fine particles sprayed from the nozzle was stabilized.

Thus, controlled particles having an angle of repose of 48° or less can be suitably used also in the case of forming a large-area film-like structure in which accuracy in the thickness of the structure formed is relatively unnecessary. Furthermore, they can be suitably used also in the case of forming a composite structure which is to be polished in a subsequent process. Furthermore, they can be suitably used also in the case of reciprocation by repeating relative movement between the nozzle and the substrate to gain the thickness of the structure formed and to average the thickness.

Furthermore, controlled particles having an angle of repose of 44° or less are very excellent in the stability of the quantity of brittle material fine particles sprayed from the nozzle.

Thus, this embodiment can exhibit high manufacturing performance also in the case of forming a structure requiring high accuracy in thickness and in the case of forming a thin film-like structure having a thickness of several μm or less. By using controlled particles having an angle of repose of 44° or less in such applications, more favorable structures can be formed.

To favorably form a composite structure, the quantity of water in the controlled particle is preferably taken into consideration. On the basis of the inventors' findings, if the quantity of wafer in the controlled particle 31 is 0.45 weight % or less, composite structure formation can be favorably performed. The quantity of wafer can be determined illustratively by measuring the weight decrease of controlled particles 31 when heated to approximately 300° C.

Furthermore, from the viewpoint of preventing contamination of the composite structure formed, the carbon content in the controlled particle 31 is preferably 1 weight % or less. A resin binder may be used in producing controlled particles 31. In the case of composite structure formation using the aerosol deposition method for film formation at normal temperature, if the resin binder is mixed in the controlled particles 31, it may interfere with aerosolation, or cause the trouble of contaminating the composite structure with the resin. Hence, the controlled particles including the resin binder need to be heat treated at several hundred degrees to burn off the resin binder. In this case, insufficient heat treatment may leave carbon in the controlled particles and allow impurity (carbon) to be mixed in the composite structure formed. Hence, preferably, depending on the kind of the resin binder, for example, the heat treatment temperature is suitably selected to minimize the quantity of residual carbon. On the basis of the inventors' findings, if the carbon content is 1 weight % or less, composite structure formation can be favorably performed, and the effect of impurity, if any, mixed in the composite structure can be prevented.

The controlled particle 31 as described above can be manufactured by using a spray dryer method, pan granulator, pot granulator and the like. Here, as described above, in manufacturing the controlled particle 31, a binder may be added, or water and the like may be added. The spray dryer method, pan granulator, pot granulator and the like can be based on known techniques, and hence the description thereof is omitted. The shape, size, and hardness of the controlled particle can be varied by suitably setting various control factors in these methods, such as the spray quantity, spray condition, temperature and the like of the spray dryer, common factors of the granulator, including rotation speed and rotation time, as well as the structure and size of the granulator, and the quantity of water added thereto.

Figures 14A, 14B, 14C:
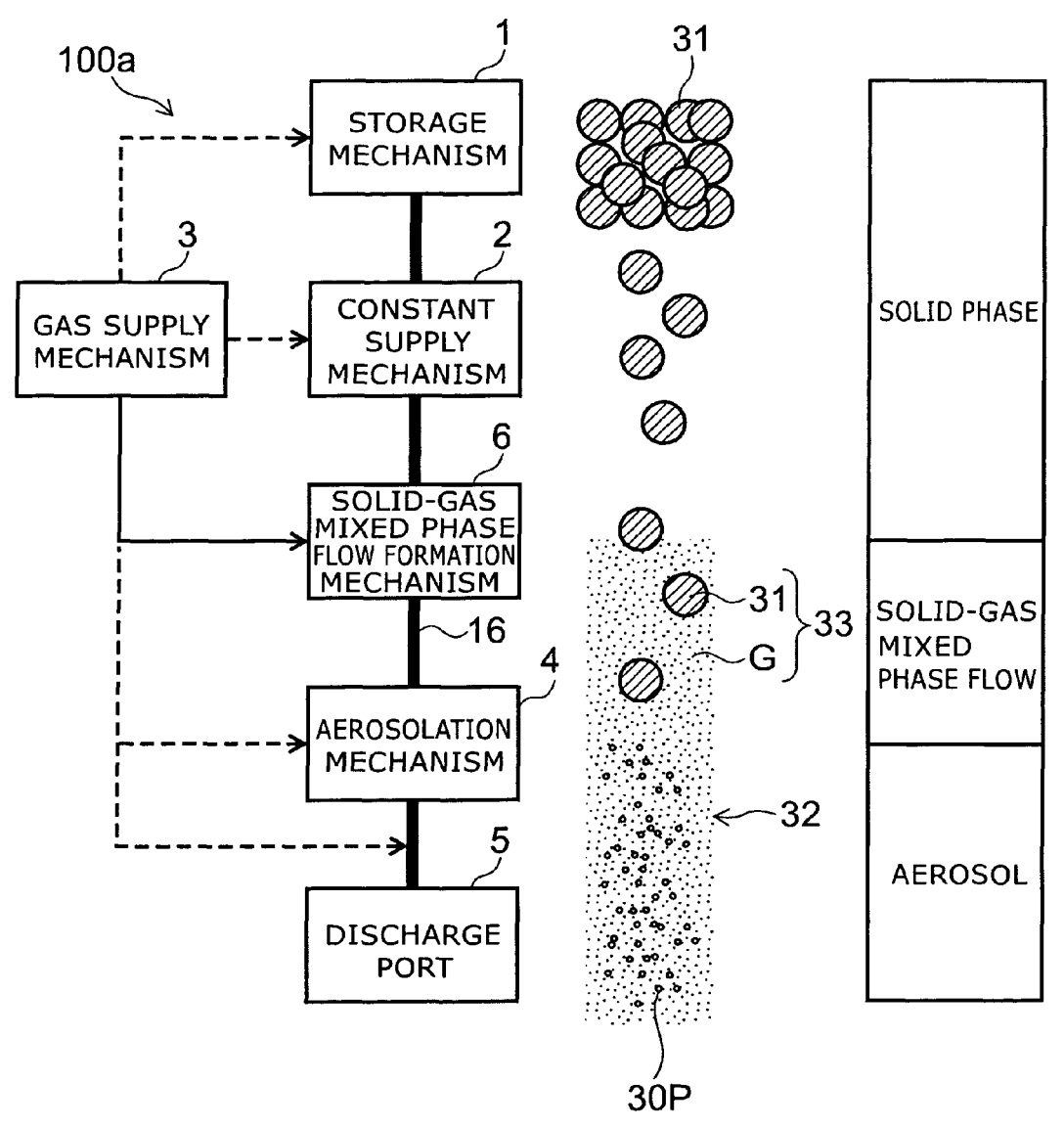

FIG. 14 is a schematic view for illustrating the basic configuration of a composite structure formation system according to a second embodiment of the invention. More specifically, FIG. 14A is a block diagram for illustrating the basic configuration of a composite structure formation system (aerosol deposition apparatus), FIG. 14B schematically shows the process flow from storage to aerosolation of controlled particles, and FIG. 14C shows state changes in the process from storage to aerosolation of controlled particles. Here, FIGS. 14B and 14C are depicted so as to correspond to the components shown in FIG. 14A.

As shown in FIG. 14A, the composite structure formation system (aerosol deposition apparatus) 100*a* according to this embodiment includes a storage mechanism 1, a constant supply mechanism 2, a gas supply mechanism 3, an aerosolation mechanism 4, and a discharge port 5, like the composite structure formation system 100 illustrated in FIG. 1A.

In addition, this embodiment further includes a solid-gas mixed phase flow formation mechanism 6 between the constant supply mechanism 2 and the aerosolation mechanism 4.

The solid-gas mixed phase flow formation mechanism 6 is intended to form a solid-gas mixed phase flow 33 from controlled particles 31 supplied by the constant supply mechanism 2 and a gas G supplied by the gas supply mechanism 3. The solid-gas mixed phase flow 33 formed by the solid-gas mixed phase flow formation mechanism 6 is supplied to the aerosolation mechanism 4 through a supply channel 16.

The solid-gas mixed phase flow formation mechanism 6 thus provided serves to form a homogeneous and stable solid-gas mixed phase flow 33. Furthermore, the solid-gas mixed phase flow 33 thus formed serves not only to supply controlled particles 31, but also to accelerate the controlled particles 31 toward the aerosolation mechanism 4. Hence, disaggregation by mechanical impact using the kinetic energy of the accelerated controlled particles 31 facilitates aerosolation.

The rest of the configuration and the associated operations are the same as those described with reference to FIG. 1, and hence the description thereof is omitted.

FIG. 15 is a schematic view for illustrating the basic configuration of a composite structure formation system according to a third embodiment of the invention. More specifically, FIG. 15A is a block diagram for illustrating the basic configuration of a composite structure formation system (aerosol deposition apparatus), FIG. 15B schematically shows the process flow from storage to aerosolation of controlled particles, and FIG. 15C shows state changes in the process from storage to aerosolation of controlled particles. Here, FIGS. 15B and 15C are depicted so as to correspond to the components shown in FIG. 15A.

As shown in FIG. 15A, the composite structure formation system (aerosol deposition apparatus) 100*b* according to this embodiment includes a storage mechanism 1, a constant supply mechanism 2, a gas supply mechanism 3, an aerosolation mechanism 4, and a discharge port 5.

In this embodiment, controlled particles 31 are supplied from the constant supply mechanism 2 to the aerosolation mechanism 4 without forming the aforementioned solid-gas mixed phase flow 33. Furthermore, the aerosolation mechanism 4 is supplied with a gas G from the gas supply mechanism 3. In the aerosolation mechanism 4, the controlled particles 31 supplied are disaggregated to form an aerosol 32 in which fine particles 30P are dispersed in the gas G.

Disaggregation of the controlled particle 31 can be performed illustratively by providing a "grinding mechanism", not shown, in the aerosolation mechanism 4 to grind the supplied controlled particles 31.

Alternatively, the supplied controlled particles 31 can be accelerated by electrostatic attraction or gravity and disaggregated by mechanical impact based on the kinetic energy of the accelerated controlled particles 31.

The rest of the configuration and the associated operations are the same as those described with reference to FIG. 1, and hence the description thereof is omitted.

Figure 16:
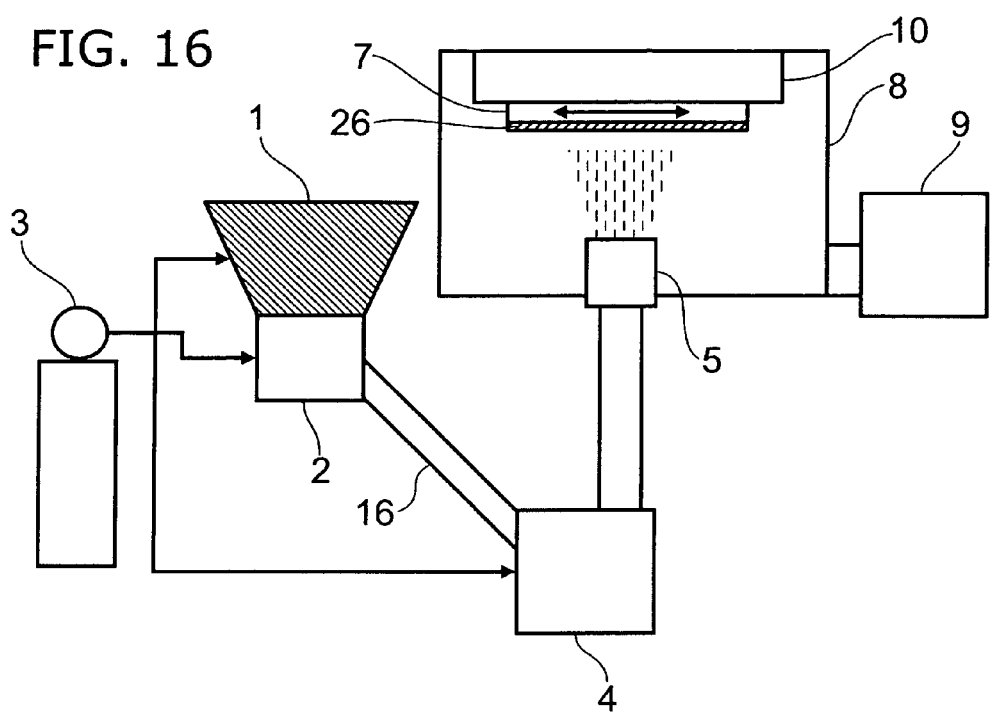
FIG. 16 is a schematic view for illustrating a first example of the composite structure formation system according to the embodiment of the invention.

FIG. 16 is a schematic view for illustrating a first example of the composite structure formation system (aerosol deposition apparatus) according to the embodiment of the invention.

The same components as those described with reference to FIG. 1 are labeled with like reference numerals, and the description thereof is omitted.

This example includes a structure formation chamber 8. The discharge port 5, in at least its tip portion, and a support scan mechanism 10 for supporting a substrate 7 are placed in the structure formation chamber 8. The substrate 7 transported into the structure formation chamber 8 is supported by, for example, an electrostatic chuck incorporated in the support scan mechanism 10.

The internal space of the structure formation chamber 8 can be maintained in a reduced-pressure state by an evacuation mechanism 9. The evacuation mechanism 9 can illustratively be a rotary pump, and can maintain a reduced-pressure atmosphere, which has a lower pressure than the atmospheric pressure, inside the structure formation chamber 8.

The aerosol generated in the aerosolation mechanism 4 is sprayed from the discharge port 5 toward the substrate 7, and a film-like structure 26 made of raw material fine particles is formed on the substrate 7. Here, because of the reduced-pressure environment in the structure formation chamber 8, the aerosol is accelerated by the pressure difference and collides with the substrate 7. Consequently, a robust film-like structure can be formed on the substrate 7 as described above.

Furthermore, by maintaining the structure formation chamber 8 in a reduced-pressure state, the "new surface" formed by collision of the aerosol with the substrate 7 can be maintained in an active state for a longer period of time, which serves to increase the compactness and strength of the film-like structure.

Furthermore, a film-like structure 26 can be formed while the substrate 7 is supported on the support scan mechanism 10 to suitably move its position in at least one of XYZθ directions. That is, by spraying the aerosol while suitably scanning the substrate 7 by the support scan mechanism 10, a film-like structure 26 can be formed on a substrate 7 having a larger area than the beam size of the aerosol sprayed from the discharge port 5.

According to this example, the aforementioned controlled particles 31 are stored in the storage mechanism 1, and reliably supplied by the constant supply mechanism 2. Thus, the supply quantity can be readily made constant. Furthermore, as described above, disaggregation in the process of supply to the aerosolation mechanism 4 and adhesion, stacking and the like associated therewith can be prevented, and hence constant supply capability can be significantly enhanced. Thus, the fine particle concentration in the aerosol can be made constant. Consequently, in the case where the discharge port 5 and the substrate 7 are relatively scanned to form a film-like structure 26 on the surface of a large-area substrate 7, the fine particle concentration in the aerosol can be kept constant. Hence, the film thickness and film quality can be made uniform across a large area.

Figure 17:
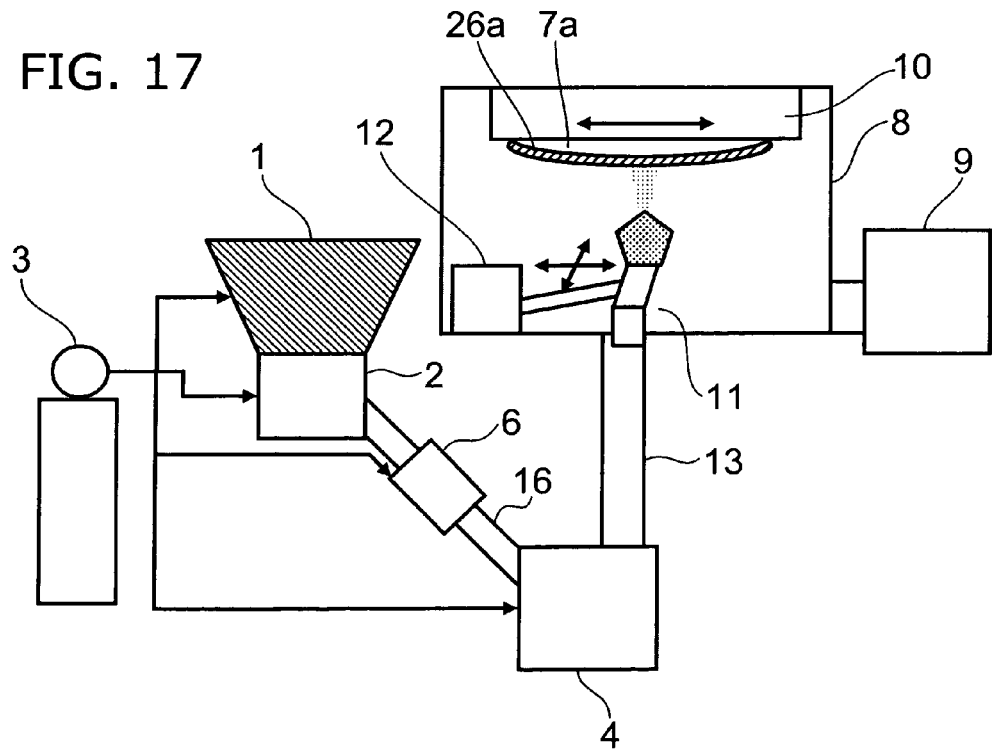
FIG. 17 is a schematic view for illustrating a second example of the composite structure formation system according to the embodiment of the invention.

FIG. 17 is a schematic view for illustrating a second example of the composite structure formation system (aerosol deposition apparatus) according to the embodiment of the invention.

The same components as those described with reference to FIGS. 14 and 16 are labeled with like reference numerals, and the description thereof is omitted.

In this example, controlled particles 31 stored inside the storage mechanism 1 are supplied to the solid-gas mixed phase flow formation mechanism 6 by the constant supply mechanism 2. Then, in the solid-gas mixed phase flow formation mechanism 6, a solid-gas mixed phase flow is formed from the controlled particles 31 supplied by the constant supply mechanism 2 and the gas supplied by the gas supply mechanism 3. The solid-gas mixed phase flow formed is supplied to the aerosolation mechanism 4 through a supply channel 16.

In addition, this example further includes a discharge port 11 having an accelerating means and a flow regulating means, and a support scan mechanism 12 is connected to the discharge port 11. The aerosol generated in the aerosolation mechanism 4 is passed through a duct 13 and sprayed from the discharge port 11 toward the substrate 7a. The aerosol can be accelerated by using the accelerating means of the discharge port 11 as well as the jet stream, compression effect and the like achieved by providing a difference in the flow channel diameter.

In this example, the discharge port 11 is supported by the support scan mechanism 12 and allowed to move in at least one of XYZθ directions. Depending on the cases, such as the substrate 7a has a solid structure or the locations to form a film-like structure 26a are scattered, the aerosol is sprayed while the discharge port 11 is moved with the linear distance between the discharge port 11 and the substrate 7a surface being kept, and thus a film-like structure 26a being uniform across a large area can be formed on the substrate 7a. Here, if the duct 13 is flexible, the displacement due to the movement of the discharge port 11 can be absorbed. Examples of the flexible duct 13 include a duct made of an elastic material such as rubber and a duct such as a bellows. In addition, the discharge port 11 and the substrate 7a only need to move relatively, and the support scan mechanism 10 may be allowed to move in at least one of XYZθ directions.

Also in this example, the aforementioned controlled particles 31 are stored in the storage mechanism 1, and reliably supplied by the constant supply mechanism 2. Thus, the supply quantity can be readily made constant. Furthermore, as described above, disaggregation in the process of supply to the aerosolation mechanism 4 and adhesion, stacking and the like associated therewith can be prevented, and hence constant supply capability can be significantly enhanced. Thus, the fine particle concentration in the aerosol can be made constant. Consequently, also in the case where the discharge port 11 and the substrate 7a are relatively scanned to form a film-like structure 26a on the surface of the substrate 7a having a solid structure or at scattered locations on the surface of the substrate 7a, the fine particle concentration in the aerosol can be kept constant. Hence, the film thickness and film quality can be made uniform across a large area.

Figure 18:
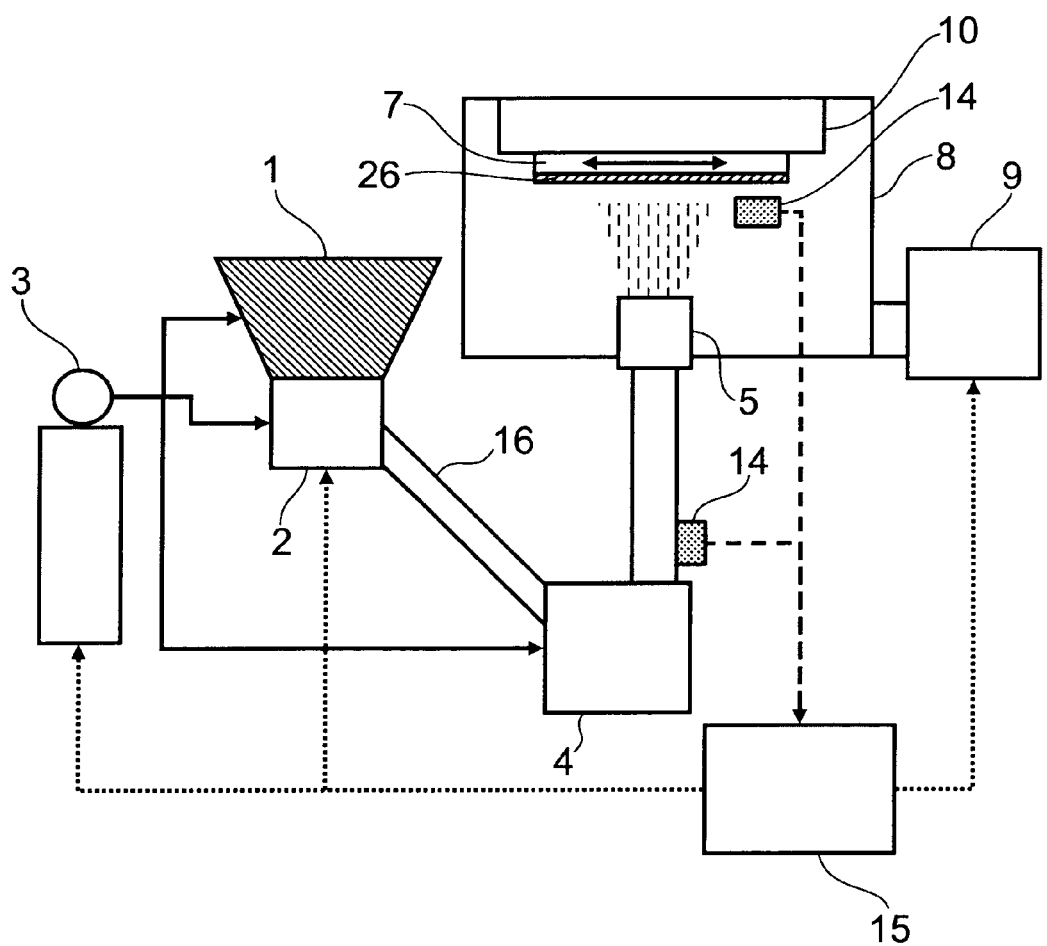
FIG. 18 is a schematic view for illustrating a third example of the composite structure formation system according to the embodiment of the invention.

FIG. 18 is a schematic view for illustrating a third example of the composite structure formation system (aerosol deposition apparatus) according to the embodiment of the invention.

The same components as those described with reference to FIGS. 1, 16 and the like are labeled with like reference numerals, and the description thereof is omitted.

In this example, a measuring mechanism 14 for measuring the fine particle concentration in the aerosol is provided between the discharge port 5 and the substrate 7. The measuring mechanism 14 is electrically connected to a control mechanism 15. The control mechanism 15 is electrically connected also to the constant supply mechanism 2, the gas supply mechanism 3, and the evacuation mechanism 9 for the feedback control described later. In the connection for the feedback control described later, it is only necessary to provide electrical connection to at least the constant supply mechanism 2.

The measuring mechanism 14 can be provided at a location where the concentration of fine particles contained in the aerosol can be measured. Here, for example, as shown in FIG. 18, the measuring mechanism 14 may be provided outside or inside the structure formation chamber 8, or inside and outside the structure formation chamber 8. The number of measuring mechanisms 14 provided can also be suitably varied.

In this example, the concentration of fine particles contained in the aerosol sprayed from the discharge port 5 is measured by the measuring mechanism 14, and the measured information is transmitted from the measuring mechanism 14 to the control mechanism 15. On the basis of the transmitted information, the control mechanism 15 performs feedback control on the constant supply mechanism 2, the gas supply mechanism 3, and the evacuation mechanism 9. Here, it is only necessary to perform feedback control on at least the constant supply mechanism 2.

Figure 19:
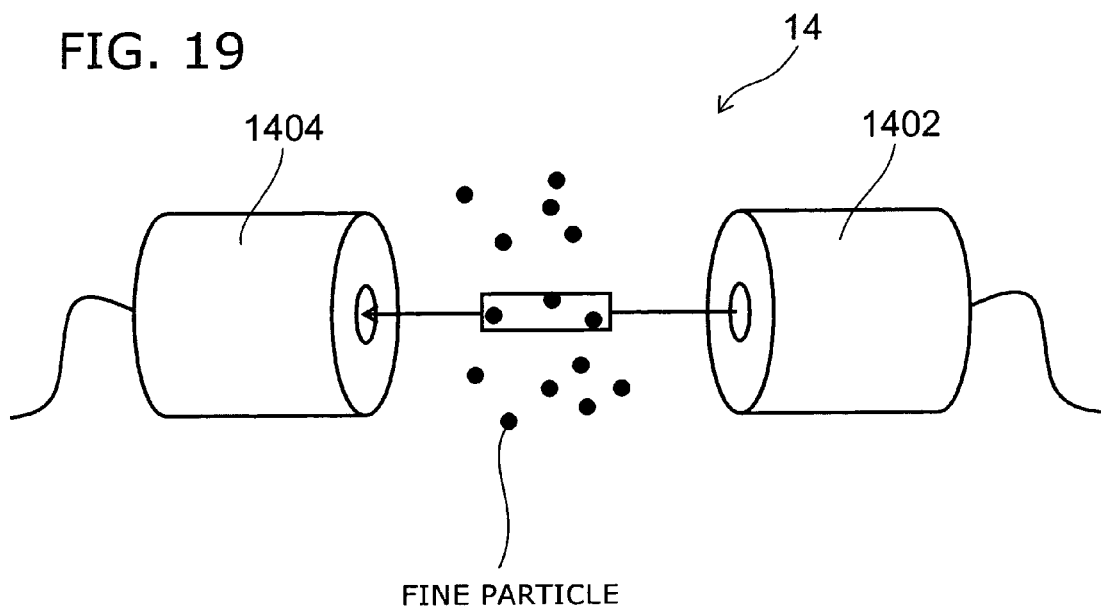
FIGS. 19 to 21 are schematic views for illustrating measuring mechanisms which can be used in this embodiment.
Figure 20:
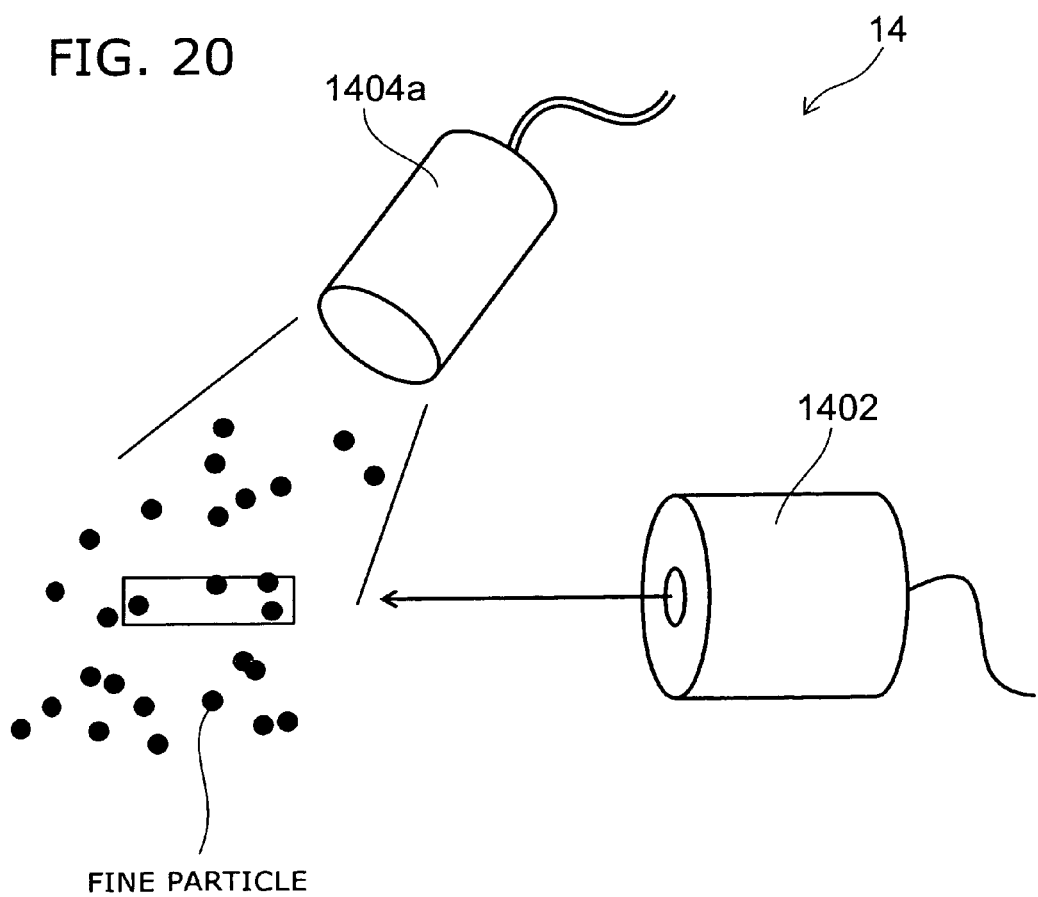
Figure 21:
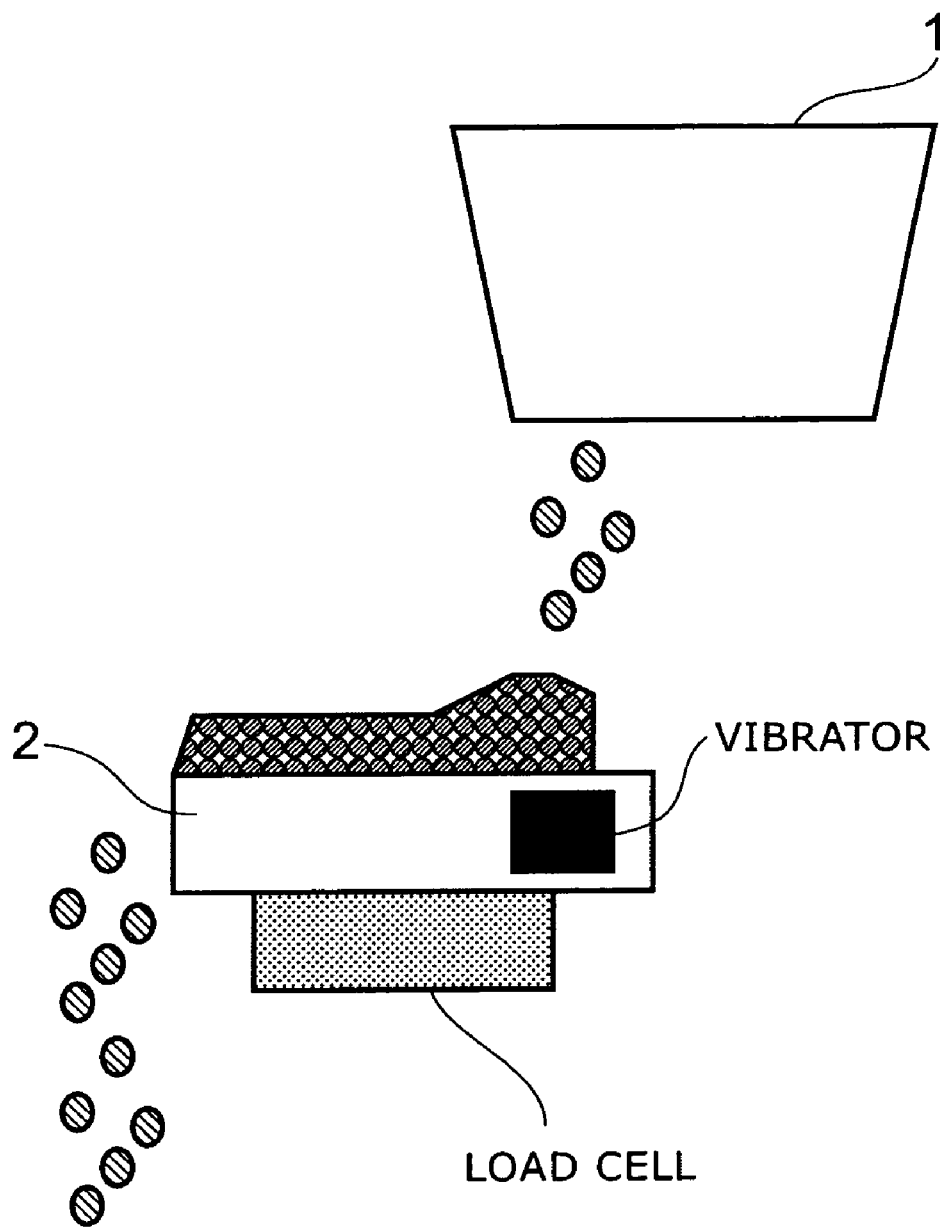

FIGS. 19 to 21 are schematic views for illustrating measuring mechanisms which can be used in this embodiment.

As shown in FIG. 19, the measuring mechanism 14 can illustratively include a light projection means 1402 such as a laser and a light receiving means 1404 for monitoring the light. In this case, the concentration of fine particles contained in the aerosol can be measured by irradiating the aerosol with laser light from the light projection means 1402 and monitoring the quantity of transmission thereof.

Alternatively, as illustrated in FIG. 20, the aerosol may be irradiated with laser light from the light projection means 1402 such as a laser, and the reflected light may be monitored by the light receiving means 1404a such as a CCD (charge coupled device) sensor.

Alternatively, as illustrated in FIG. 21, the constant supply mechanism 2 can be provided with a load cell to measure the weight change of the constant supply mechanism 2, thereby measuring the supply quantity. By varying the amplitude and the like of a vibrator in accordance with the weight change, controlled particles 31 can be always supplied in a constant weight. In this case, for higher readability of the weight change, a multi-stage constant supply mechanism can be used to measure and control the supply quantity with higher precision.

Also in this example, the aforementioned controlled particles 31 are stored in the storage mechanism 1, and reliably supplied by the constant supply mechanism 2. Thus, the supply quantity can be readily made constant. Furthermore, as described above, disaggregation in the process of supply to the aerosolation mechanism 4 and adhesion, stacking and the like associated therewith can be prevented, and hence constant supply capability can be significantly enhanced. Thus, the fine particle concentration in the aerosol can be made constant.

Furthermore, the measuring mechanism 14 is provided, and feedback control is performed on at least the constant supply mechanism 2 by the control mechanism 15. Thus, even if any fluctuation or temporal variation occurs in the concentration of fine particles contained in the sprayed aerosol, the concentration of fine particles contained in the aerosol can be accurately controlled. Consequently, the fine particle concentration in the aerosol can be kept constant. Hence, the film thickness and film quality can be made uniform across a large area.

Because the controlled particles used are excellent in suppliability and ready to be supplied in constant quantities, the aforementioned feedback control is highly accurate, and favorable.

Next, examples of the constant supply mechanism 2 are illustrated.

Figure 22:
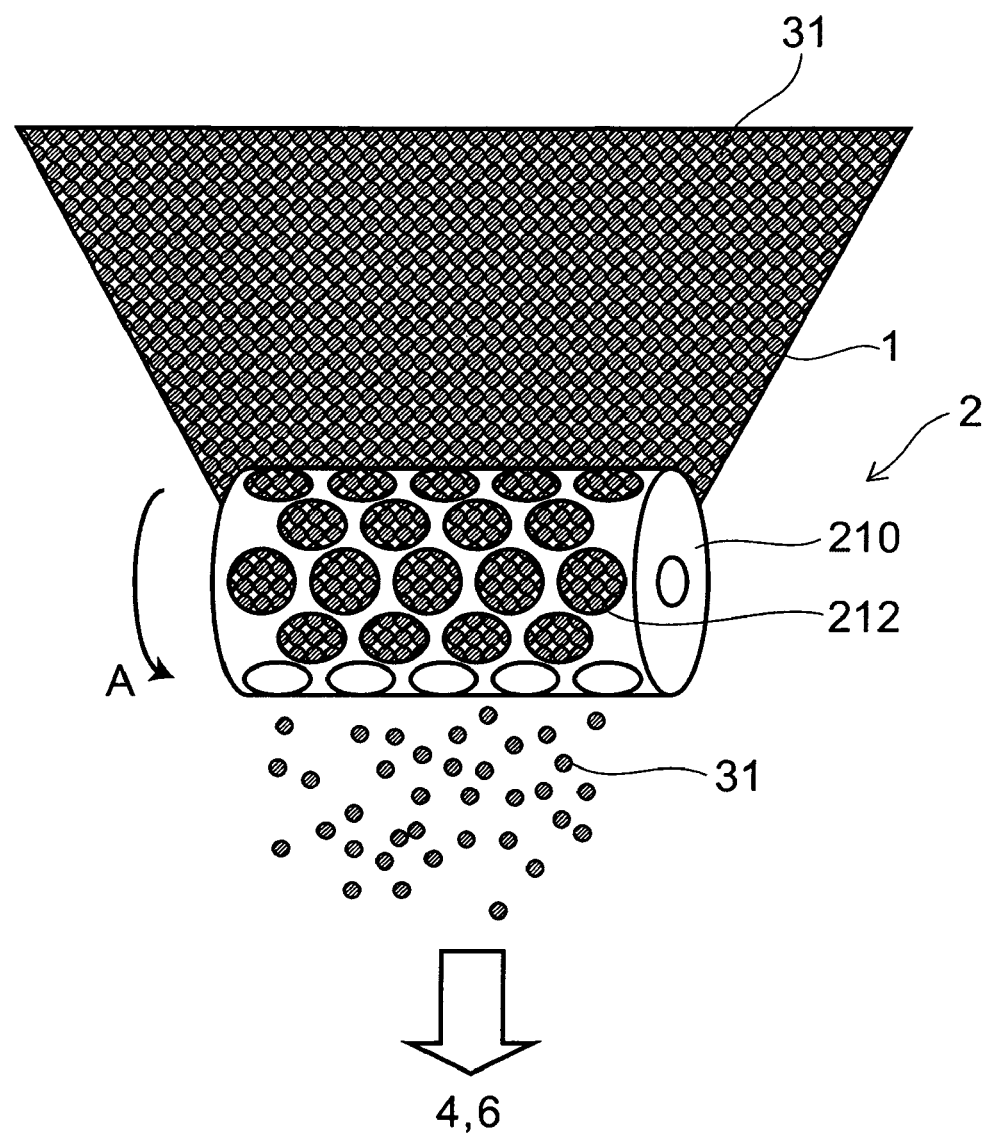
FIG. 22 is a schematic view for illustrating a first example of the constant supply mechanism 2.

FIG. 22 is a schematic view for illustrating a first example of the constant supply mechanism 2.

More specifically, FIG. 22 is a schematic perspective view of a relevant part of the constant supply mechanism 2.

In this example, an opening is provided at the vertical bottom of the storage mechanism 1 storing controlled particles 31, and a roller 210 is provided so as to occlude this opening. The roller 210 has a plurality of recesses 212 on its surface, and rotates in the direction of the arrow A or in the direction opposite thereto. The recess 212 has a capacity sufficiently larger than the controlled particle 31. The gap between the inner sidewall of the storage mechanism 1 and the surface of the roller 210 is sufficiently narrowed as long as the rotation of the roller 210 is not hampered, so that controlled particles 31 do not drop out of this gap. Here, an elastic seal such as rubber may be provided on the inner sidewall or opening end of the storage mechanism 1 so as to be in contact with the surface of the roller 210.

In the storage mechanism 1, controlled particles 31 are filled by their self-weight in the recess 212 of the roller 210, and supplied to the outside (downside) of the storage mechanism 1 by the rotation of the roller 210. When the recess 212 is directed vertically downward, the controlled particles 31 fall by self-weight. By providing the solid-gas mixed phase flow formation mechanism 6 or the aerosolation mechanism 4 at this falling destination, an aerosol having a constant concentration of fine particles can be formed.

In this example, a prescribed quantity of controlled particles 31 filled in the recess 212 are supplied from the storage mechanism 1 in response to the rotation of the roller 210 and falls toward the solid-gas mixed phase flow formation mechanism 6 or the aerosolation mechanism 4. That is, a prescribed quantity of controlled particles 31 can be successively supplied.

Furthermore, in the storage mechanism 1, the controlled particles 31 are filled by their self-weight in the recess 212 of the roller 210, and hence not excessively packed down. That is, the controlled particles 31 are supplied without collapse. Thus, it is possible to prevent controlled particles 31 with altered properties from being supplied from the constant supply mechanism 2.

Furthermore, because the controlled particles 31 are not excessively packed down into the recess 212, the controlled particles 31 therein can smoothly fall by self-weight when the recess 212 is directed vertically downward by the rotation of the roller 210. That is, it is also possible to avoid the problem of the controlled particles 31 failing to fall from inside the recess 212, and the controlled particles 31 can be stably supplied. Hence, the controlled particles 31 with the aforementioned properties such as mean compressive fracture strength, circularity, and angle of repose being adjusted can be directly supplied, thereby stabilizing the supply. Thus, stable supply on target can be achieved without stacking.

Figure 23:
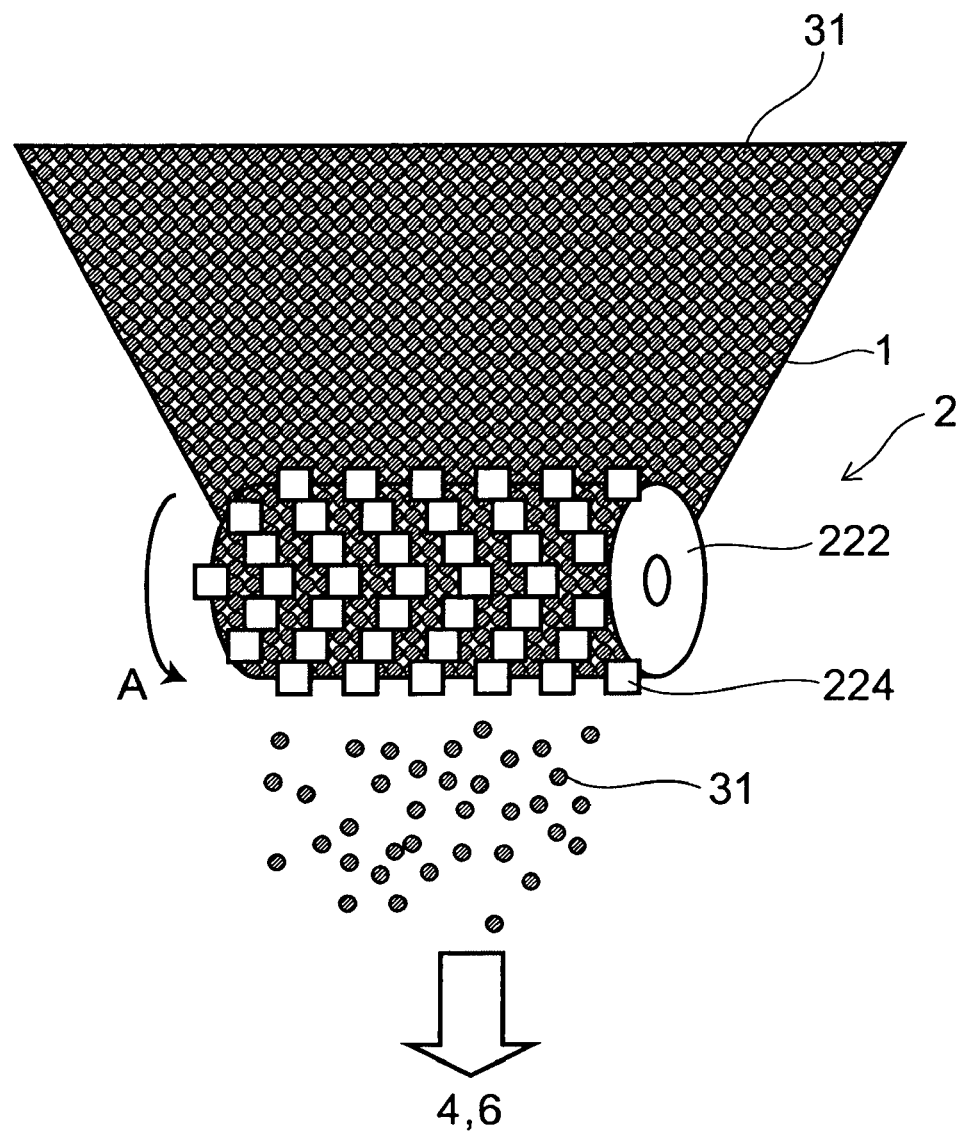
FIG. 23 is a schematic view for illustrating a second example of the constant supply mechanism 2.
Figure 24:
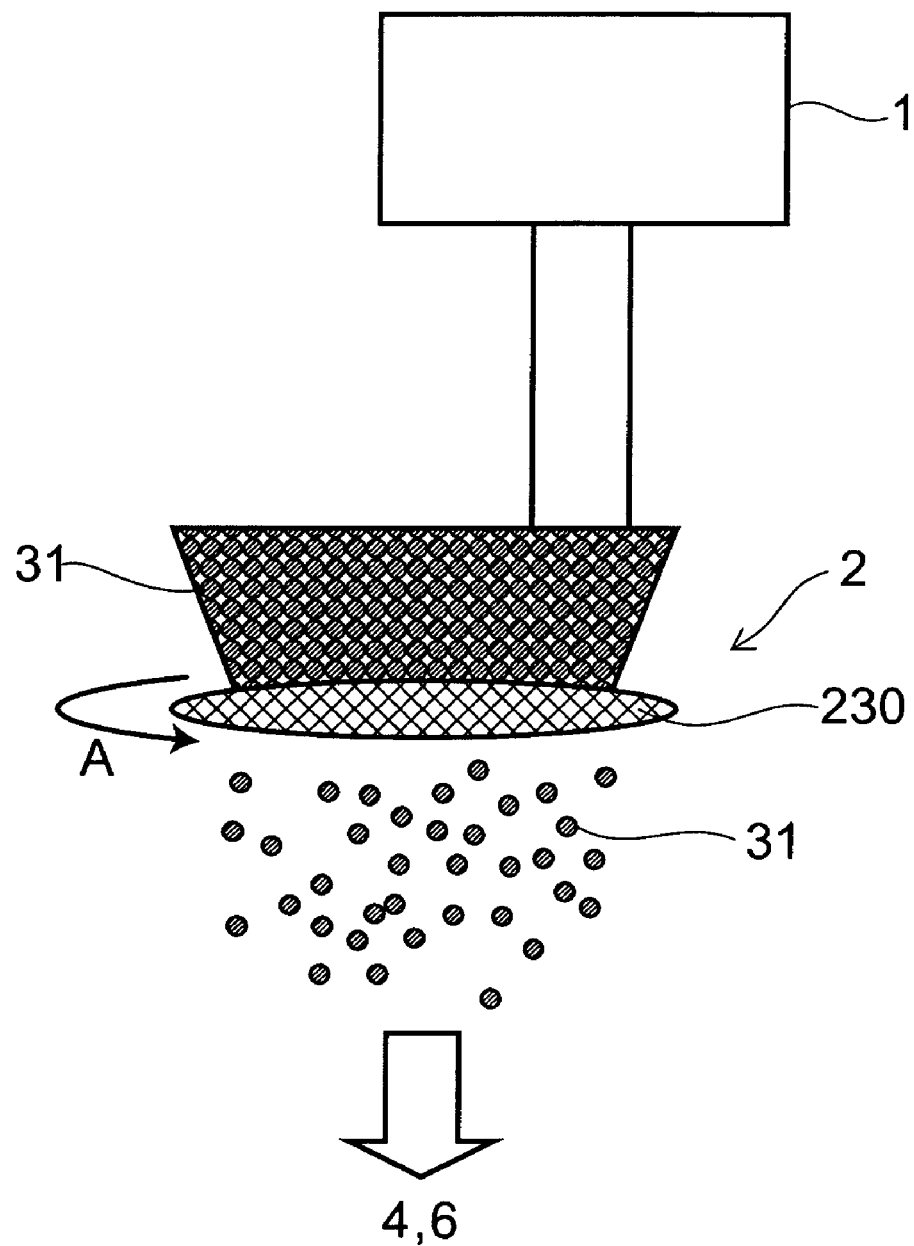
FIG. 24 is a schematic view for illustrating a third example of the constant supply mechanism 2.
Figure 25:
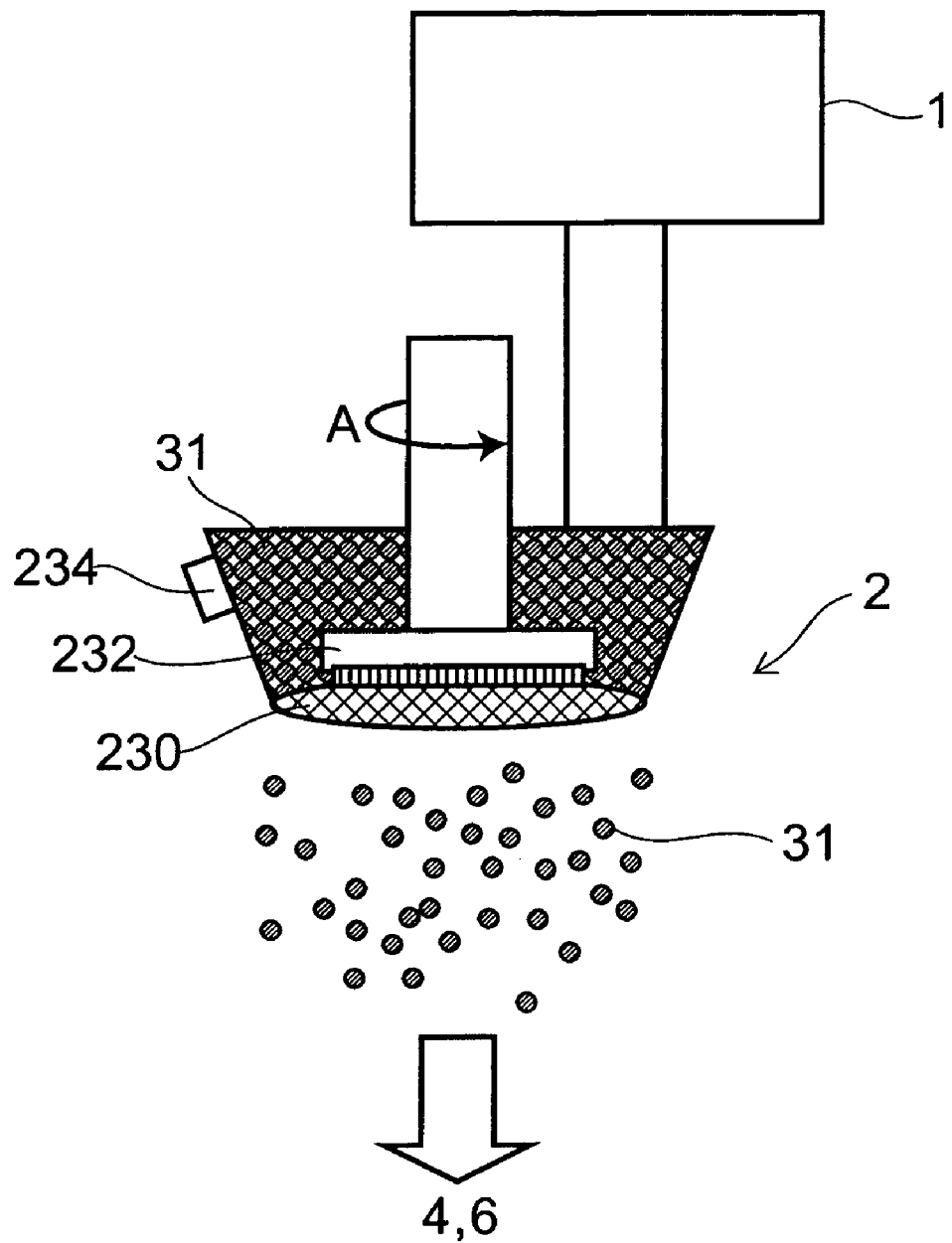
FIG. 25 is a schematic view for illustrating a fourth example of the constant supply mechanism 2.

FIG. 23 is a schematic view for illustrating a second example of the constant supply mechanism 2.

Also in this example, an opening is provided at the vertical bottom of the storage mechanism 1 storing controlled particles 31. Furthermore, a roller 222 is provided so as to occlude this opening. The roller 222 has a plurality of protrusions 224 on its surface, and rotates in the direction of the arrow A or in the direction opposite thereto.

In this example, because the protrusions 224 are provided on the surface of the roller 222, a gap corresponding to the height of the protrusion 224 occurs between the surface of the roller 222 and the inner sidewall of the storage mechanism 1. However, by providing the protrusions 224 relatively densely on the surface of the roller 222 or suitably adjusting the shape and layout of the protrusions 224, controlled particles 31 can be prevented from continuously dropping out of the gap between the opening at the lower end of the storage mechanism 1 and the surface of the roller 222.

In response to the rotation of the roller 222, controlled particles 31 stored in the storage mechanism 1 are pushed out by the protrusions 224, fall by self-weight, and are supplied to the solid-gas mixed phase flow formation mechanism 6 or the aerosolation mechanism 4. The controlled particles 31 stored in the storage mechanism 1 are ejected as if they are scraped out by each protrusion 224. Hence, the quantity of controlled particles 31 can be controlled by the shape and number of the protrusions 224, and the rotation speed.

In this example, in the storage mechanism 1, the controlled particles 31 are in contact with the surface of the roller 222 by their self-weight, and pushed out by the protrusions 224. Hence, the controlled particles 31 are not excessively packed down. That is, the controlled particles 31 are supplied without collapse. Thus, it is possible to prevent controlled particles 31 with altered properties from being supplied from the constant supply mechanism 2. Hence, the controlled particles 31 with the aforementioned properties such as mean compressive fracture strength, circularity, and angle of repose being adjusted can be directly supplied, thereby stabilizing the supply. Thus, stable supply on target can be achieved without stacking.

FIG. 24 is a schematic view for illustrating a third example of the constant supply mechanism 2.

In this example, a generally circular opening is provided at the vertical bottom of the storage mechanism 1 storing controlled particles 31. Furthermore, a mesh 230 is provided at this opening. The mesh 230 rotates in the direction of the arrow A or in the direction opposite thereto while being in contact with the bottom of the storage mechanism 1.

In this example, by the rotation of the mesh 230, controlled particles 31 fall through the openings of the mesh 230. The falling quantity of controlled particles 31 depends on the opening size, rotation speed and the like of the mesh 230. Here, if the opening size of the mesh is in the range from 2 to 7 times the mean particle diameter of the controlled particles 31, the controlled particles 31 can be bridged over each other when the mesh 230 is at rest, and hence unnecessary fall can be avoided. Consequently, the supply quantity of controlled particles 31 can be readily controlled by the rotation of the mesh 230.

In this example, in the storage mechanism 1, the controlled particles 31 are in contact with the surface of the mesh 230 by their self-weight, and fall outside through the openings. Hence, the controlled particles 31 are not excessively packed down. That is, the controlled particles 31 are supplied without collapse. Thus, it is possible to prevent controlled particles 31 with altered properties from being supplied from the constant supply mechanism 2. Hence, the controlled particles 31 with the aforementioned properties such as mean compressive fracture strength, circularity, and angle of repose being adjusted can be directly supplied, thereby stabilizing the supply. Thus, stable supply on target can be achieved without stacking.

Furthermore, a plurality of controlled particles 31 are supplied nearly simultaneously and continuously through a plurality of openings of the mesh 230. That is, numerous controlled particles 31 are always supplied continuously to the solid-gas mixed phase flow formation mechanism 6 or the aerosolation mechanism 4, and the supply quantity of the controlled particles 31 is averaged in terms of time. Thus, a constant quantity of controlled particles 31 is always stably supplied, and hence an aerosol having a constant fine particle concentration can be stably generated.

FIG. 25 is a schematic view for illustrating a fourth example of the constant supply mechanism 2.

Also in this example, like that described above with reference to the third example, a circular opening is provided at the vertical bottom of the storage mechanism 1 storing controlled particles 31. Furthermore, a mesh 230 is provided at this opening. A brush 232 is placed on the mesh 230, and rotates in the direction of the arrow A or in the direction opposite thereto while being in contact with the mesh 230. Furthermore, a vibrator 234 is attached to the storage mechanism 1. The vibrator 234 vibrates the wall surface and the like of the storage mechanism 1, serving to smoothly drop and supply the controlled particles 31 stored in the storage mechanism 1 toward the brush 232 and the mesh 230. Furthermore, by applying vibration to the controlled particles 31 in the storage mechanism 1, the effect of enhancing their fluidity is also achieved.

Also in the first to third example, the vibrator 234 can be provided likewise to achieve the same operation and effect.

In this example, in response to the rotation of the brush 232, controlled particles 31 fall through the openings of the mesh 230. The falling quantity of controlled particles 31 depends on the opening size of the mesh 230 and the bristle density and rotation speed of the brush 232. Here, if the opening size of the mesh is in the range from 2 to 7 times the mean particle diameter of the controlled particles 31, the controlled particles 31 can be bridged over each other when the mesh 230 is at rest, and hence unnecessary fall can be avoided. Consequently, the supply quantity of controlled particles 31 can be readily controlled by the rotation of the brush 232.

In response to the motion of each bristle tip of the brush 232 passing through the opening of the mesh 230, controlled particles 31 are pushed out of the opening. Microscopically, the controlled particles 31 are lightly pushed out of the mesh, dropped, and supplied to the solid-gas mixed phase flow formation mechanism 6 or the aerosolation mechanism 4. That is, the controlled particles 31 are supplied without collapse. Thus, it is possible to prevent controlled particles 31 with altered properties from being supplied from the constant supply mechanism 2. Hence, the controlled particles 31 with the aforementioned properties such as mean compressive fracture strength, circularity, and angle of repose being adjusted can be directly supplied, thereby stabilizing the supply. Thus, stable supply on target can be achieved without stacking.

Furthermore, a plurality of controlled particles 31 are supplied nearly simultaneously and continuously through a plurality of openings of the mesh 230. That is, in the aerosolation mechanism 4, numerous controlled particles 31 are always supplied continuously, and the supply quantity of the controlled particles 31 is averaged in terms of time. Thus, a constant quantity of controlled particles 31 is always stably supplied, and hence an aerosol having a constant fine particle concentration can be stably generated.

Figure 26:
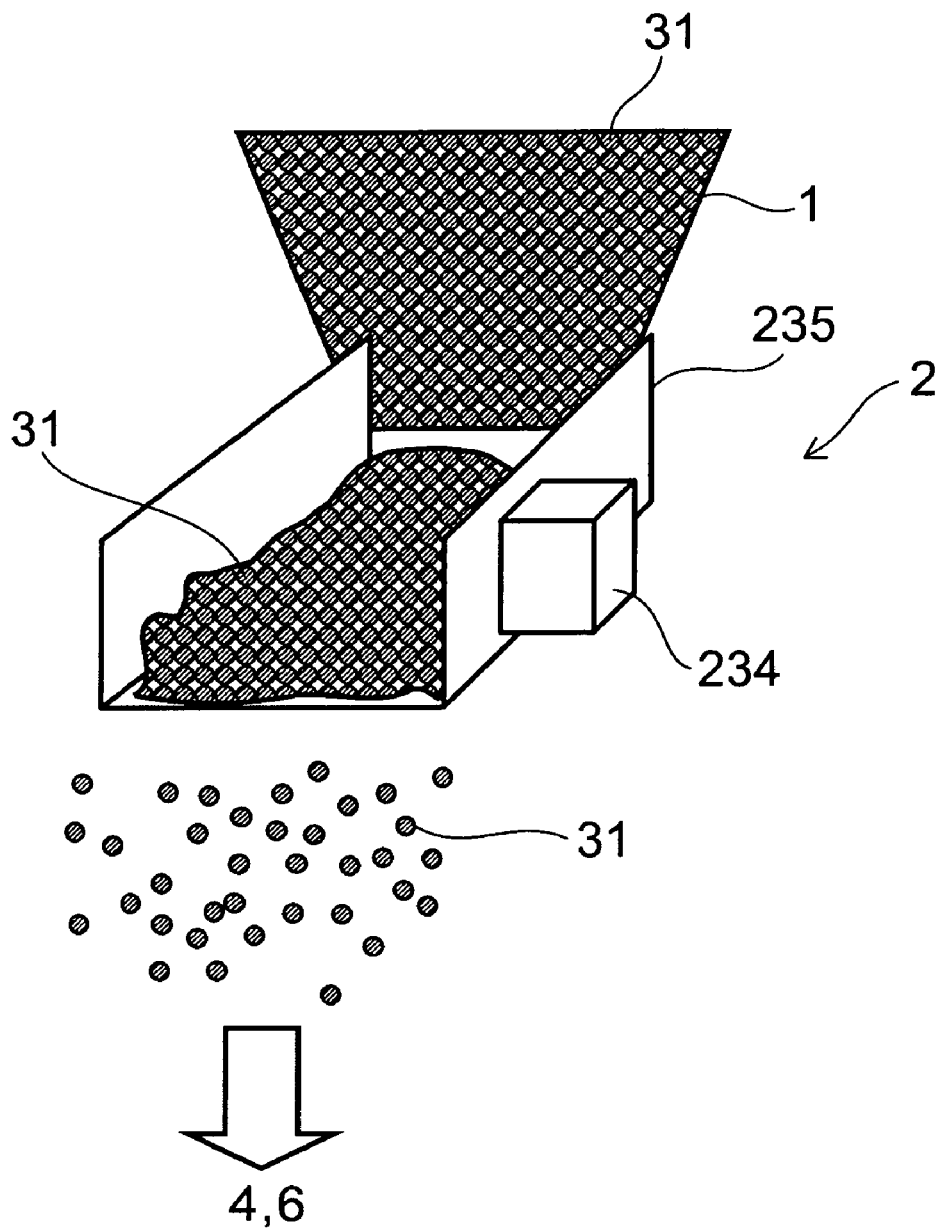
FIG. 26 is a schematic view for illustrating a fifth example of the constant supply mechanism 2.

FIG. 26 is a schematic view for illustrating a fifth example of the constant supply mechanism 2.

In this example, a supply channel 235 is provided below the storage mechanism 1 storing controlled particles 31, and a vibrator 234 is placed on the supply channel 235. The controlled particles 31 stored in the storage mechanism 1 pass through an orifice, not shown, and a prescribed quantity thereof is supplied to the supply channel 235. The controlled particles 31 supplied to the supply channel 235 are supplied from the supply channel 235 by vibration of the vibrator 234.

In this example, in the storage mechanism 1, the controlled particles 31 are passed through the orifice, not shown, by their self-weight and dropped outside (to the supply channel 235). Hence, the controlled particles 31 are not excessively packed down. Likewise, the controlled particles 31 supplied to the supply channel 235 are dropped outside by vibration of the vibrator 234, and hence the properties of the controlled particles 31 do not change. That is, the controlled particles 31 are supplied from the constant supply mechanism 2 to the outside without change in their properties. Hence, the controlled particles 31 with the aforementioned properties such as mean compressive fracture strength, circularity, and angle of repose being adjusted can be directly supplied, thereby stabilizing the supply. Thus, stable supply on target can be achieved without stacking.

Furthermore, a plurality of controlled particles 31 are supplied nearly simultaneously and continuously. That is, in the aerosolation mechanism 4, numerous controlled particles 31 are always supplied continuously, and the supply quantity of the controlled particles 31 is averaged in terms of time. Thus, a constant quantity of controlled particles 31 is always stably supplied, and hence an aerosol having a constant fine particle concentration can be stably generated.

Figure 27:
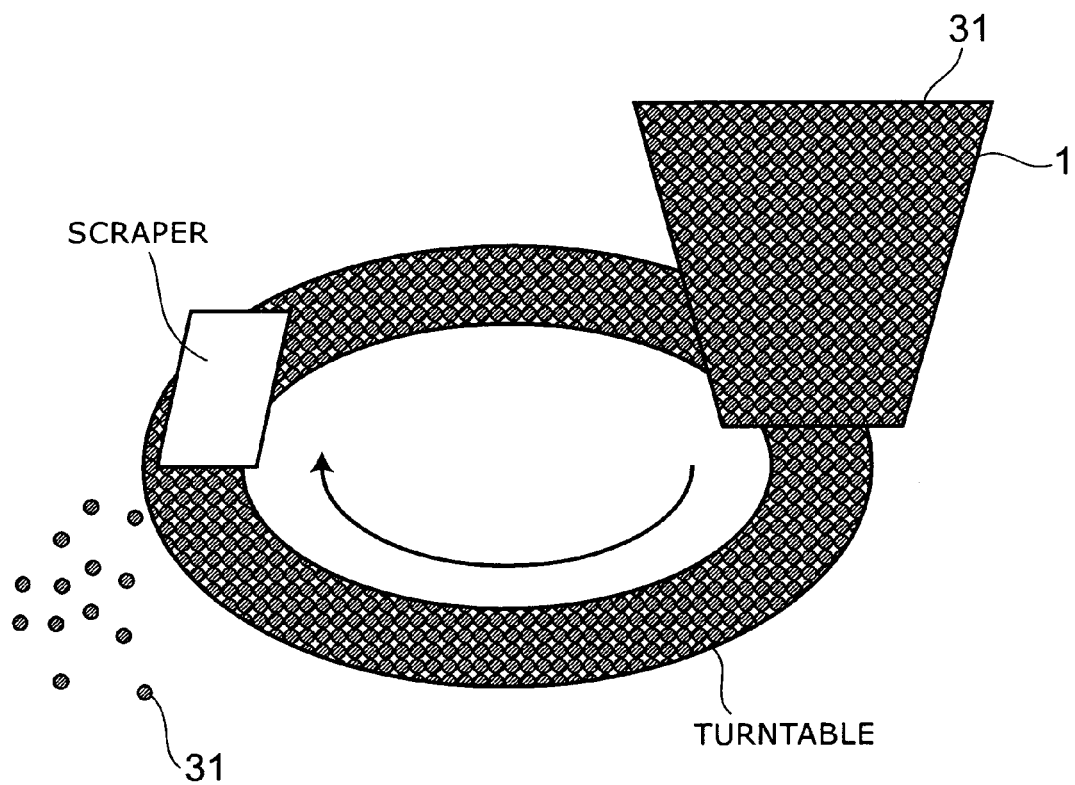
FIG. 27 is a schematic view for illustrating a sixth example of the constant supply mechanism 2.

FIG. 27 is a schematic view for illustrating a sixth example of the constant supply mechanism 2.

In this example, a turntable provided with grooves is placed below the storage mechanism 1 storing controlled particles 31, and a scraper is placed on the rotation path of the turntable.

The controlled particles 31 introduced into the groove of the turntable are supplied from the storage mechanism 1 by the rotation of the turntable. Then, the controlled particles 31 introduced into the groove are scraped out by the scraper.

In this example, in the storage mechanism 1, the controlled particles 31 are in contact with the surface of the turntable by their self-weight, introduced into the grooves, and then scraped out by the scraper. Hence, the controlled particles 31 are not excessively packed down. That is, the controlled particles 31 are supplied without collapse. Thus, it is possible to prevent controlled particles 31 with altered properties from being supplied from the constant supply mechanism 2. Hence, the controlled particles 31 with the aforementioned properties such as mean compressive fracture strength, circularity, and angle of repose being adjusted can be directly supplied, thereby stabilizing the supply. Thus, stable supply on target can be achieved without stacking.

Furthermore, a plurality of controlled particles 31 are supplied nearly simultaneously and continuously through a plurality of grooves of the turntable. That is, in the aerosolation mechanism 4, numerous controlled particles 31 are always supplied continuously, and the supply quantity of the controlled particles 31 is averaged in terms of time. Thus, in the aerosolation mechanism 4, a constant quantity of controlled particles 31 is always stably supplied, and hence an aerosol having a constant fine particle concentration can be stably generated.

Figure 28:
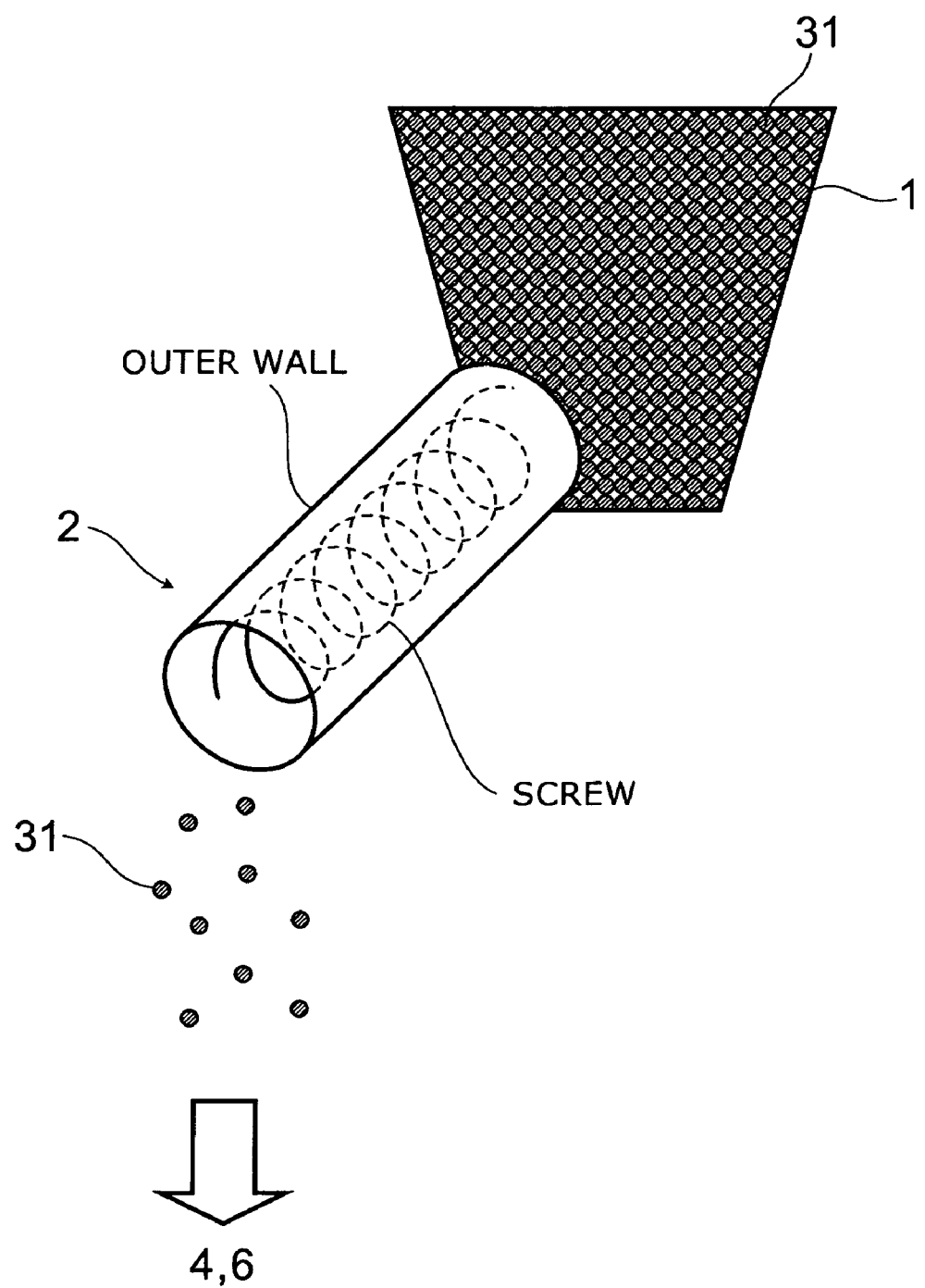
FIG. 28 is a schematic view for illustrating a seventh example of the constant supply mechanism 2.

FIG. 28 is a schematic view for illustrating a seventh example of the constant supply mechanism 2.

In this example, a screw is provided below the storage mechanism 1 storing controlled particles 31, and a motor, not shown, for rotating the screw is provided at the end of the screw. Furthermore, to smoothly rotate the screw, an outer wall having a certain length is provided on the screw, and both ends of the outer wall are opened. The controlled particles 31 introduced into the groove of the screw are supplied from the storage mechanism 1 by the rotation of the screw. At this time, the controlled particles 31 are leveled off to a constant quantity by the clearance with the outer wall, moved therethrough, and dropped from the end of the outer wall at a constant rate.

In this example, in the storage mechanism 1, the controlled particles 31 are in contact with the surface of the screw by their self-weight. Hence, the controlled particles 31 are not excessively packed down. That is, the controlled particles 31 are supplied without collapse. Thus, it is possible to prevent controlled particles 31 with altered properties from being supplied from the constant supply mechanism 2. Hence, the controlled particles 31 with the aforementioned properties such as mean compressive fracture strength, circularity, and angle of repose being adjusted can be directly supplied, thereby stabilizing the supply. Thus, stable supply on target can be achieved without stacking.

Furthermore, a plurality of controlled particles 31 are supplied nearly simultaneously and continuously by the screw. That is, in the aerosolation mechanism 4, numerous controlled particles 31 are always supplied continuously, and the supply quantity of the controlled particles 31 is averaged in terms of time. Thus, in the aerosolation mechanism 4, a constant quantity of controlled particles 31 is always stably supplied, and hence an aerosol having a constant fine particle concentration can be stably generated.

Figure 29:
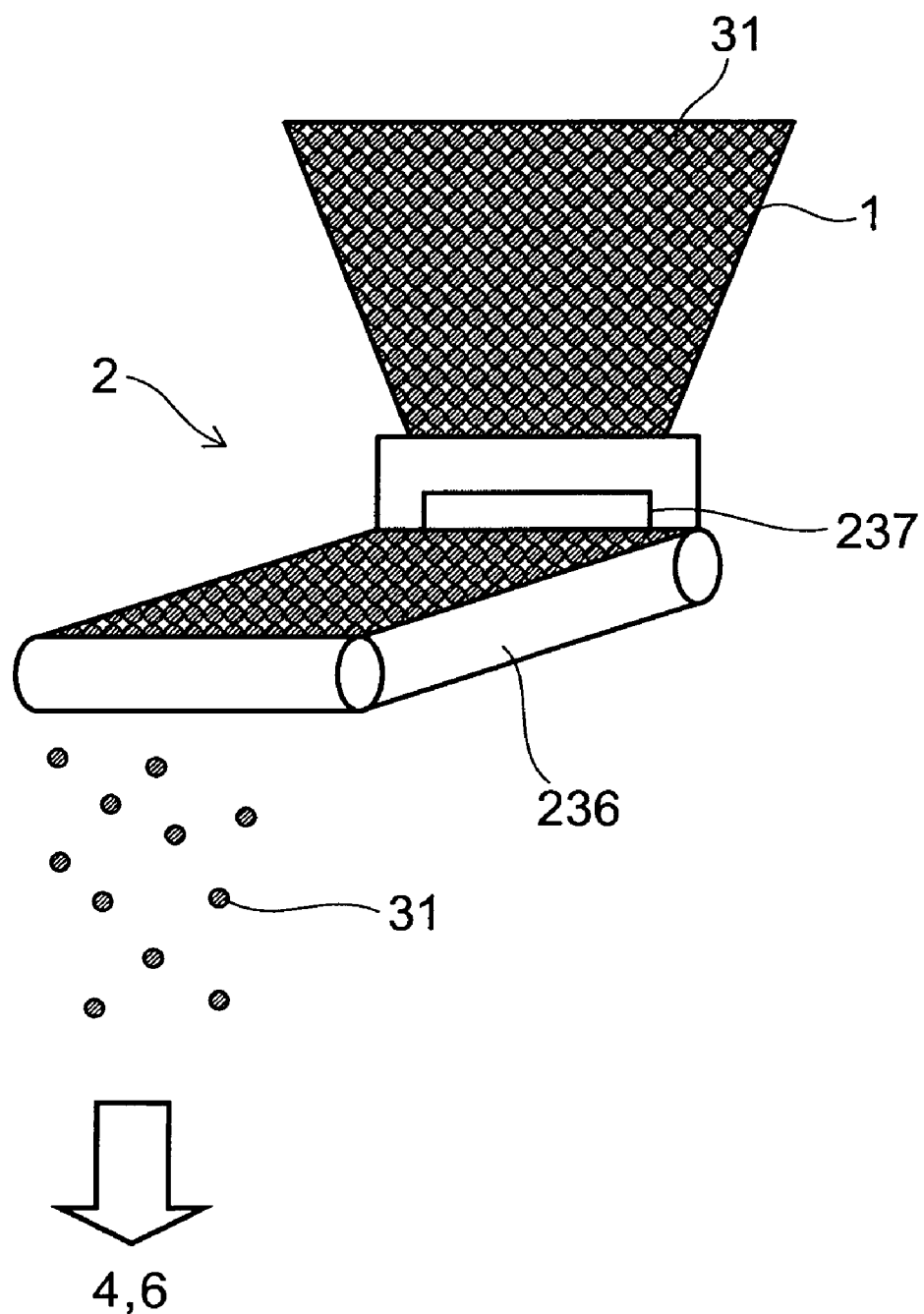
FIG. 29 is a schematic view for illustrating an eighth example of the constant supply mechanism 2.

FIG. 29 is a schematic view for illustrating an eighth example of the constant supply mechanism 2.

In this example, an orifice 237 is provided at the bottom of the storage mechanism 1 storing controlled particles 31, and a belt conveyor 236 is placed therebelow nearly horizontally with respect to the ground.

The controlled particles 31 leveled off by the orifice 237 are supplied on top of the belt conveyor 236. The belt conveyor 236 is driven at a constant speed. Hence, after being moved a prescribed length, the controlled particles 31 are dropped from the end of the belt conveyor 236 at a constant rate.

In this example, in the storage mechanism 1, the controlled particles 31 pass through the orifice 237 and fall on the belt conveyor 236 by their self-weight. Hence, the controlled particles 31 are not excessively packed down. That is, the controlled particles 31 are supplied without collapse. Thus, it is possible to prevent controlled particles 31 with altered properties from being supplied from the constant supply mechanism 2. Hence, the controlled particles 31 with the aforementioned properties such as mean compressive fracture strength, circularity, and angle of repose being adjusted can be directly supplied, thereby stabilizing the supply. Thus, stable supply on target can be achieved without stacking.

Furthermore, a plurality of controlled particles 31 are supplied nearly simultaneously and continuously through the belt conveyor 236. That is, in the aerosolation mechanism 4, numerous controlled particles 31 are always supplied continuously, and the supply quantity of the controlled particles 31 is averaged in terms of time. Thus, in the aerosolation mechanism 4, a constant quantity of controlled particles 31 is always stably supplied, and hence an aerosol having a constant fine particle concentration can be stably generated.

Figure 30:
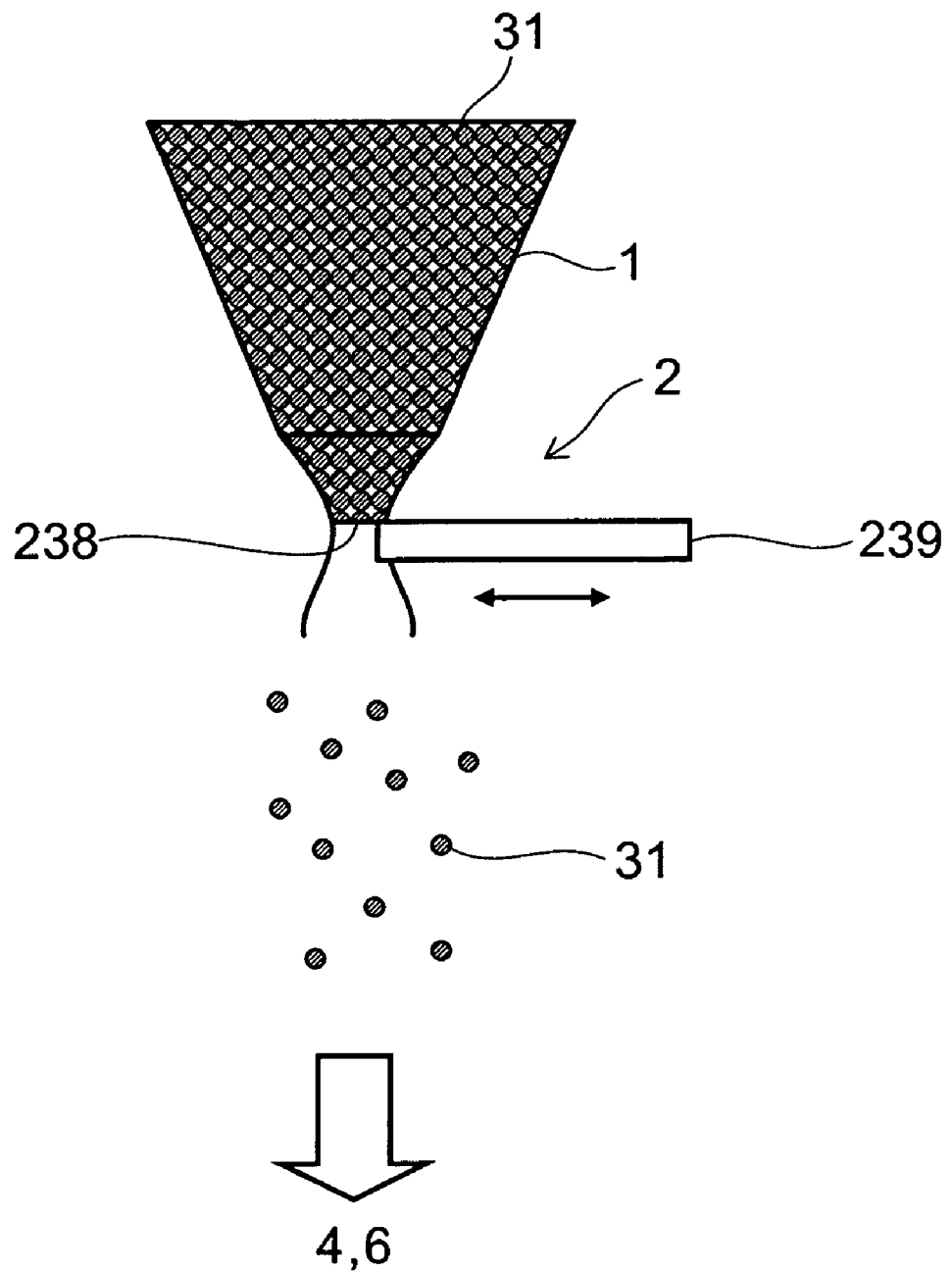
FIG. 30 is a schematic view for illustrating a ninth example of the constant supply mechanism 2.

FIG. 30 is a schematic view for illustrating a ninth example of the constant supply mechanism 2.

In this example, an orifice 238 is provided at the bottom of the storage mechanism 1 storing controlled particles 31, and a shutter 239 for opening and closing the orifice 238 is further provided. The opening shape of the orifice 238 is suitably determined in accordance with the size of the controlled particle 31. By opening and closing the shutter 239, supply of controlled particles 31 can be started and stopped.

In this example, in the storage mechanism 1, the controlled particles 31 pass through the orifice 238 and fall outside by their self-weight. Hence, the controlled particles 31 are not excessively packed down. That is, the controlled particles 31 are supplied without collapse. Thus, it is possible to prevent controlled particles 31 with altered properties from being supplied from the constant supply mechanism 2. Hence, the controlled particles 31 with the aforementioned properties such as mean compressive fracture strength, circularity, and angle of repose being adjusted can be directly supplied, thereby stabilizing the supply. Thus, stable supply on target can be achieved without stacking.

Furthermore, a plurality of controlled particles 31 are supplied nearly simultaneously and continuously through the orifice 238. That is, in the aerosolation mechanism 4, numerous controlled particles 31 are always supplied continuously, and the supply quantity of the controlled particles 31 is averaged in terms of time. Thus, in the aerosolation mechanism 4, a constant quantity of controlled particles 31 is always stably supplied, and hence an aerosol having a constant fine particle concentration can be stably generated.

Controlled particles having a certain bonding strength or more and a controlled shape can be favorably used in the aforementioned constant supply mechanisms, because the controlled particle is not broken or disaggregated in the supply process.

Next, the aerosolation mechanism 4 is described with reference to examples.

Figure 31:
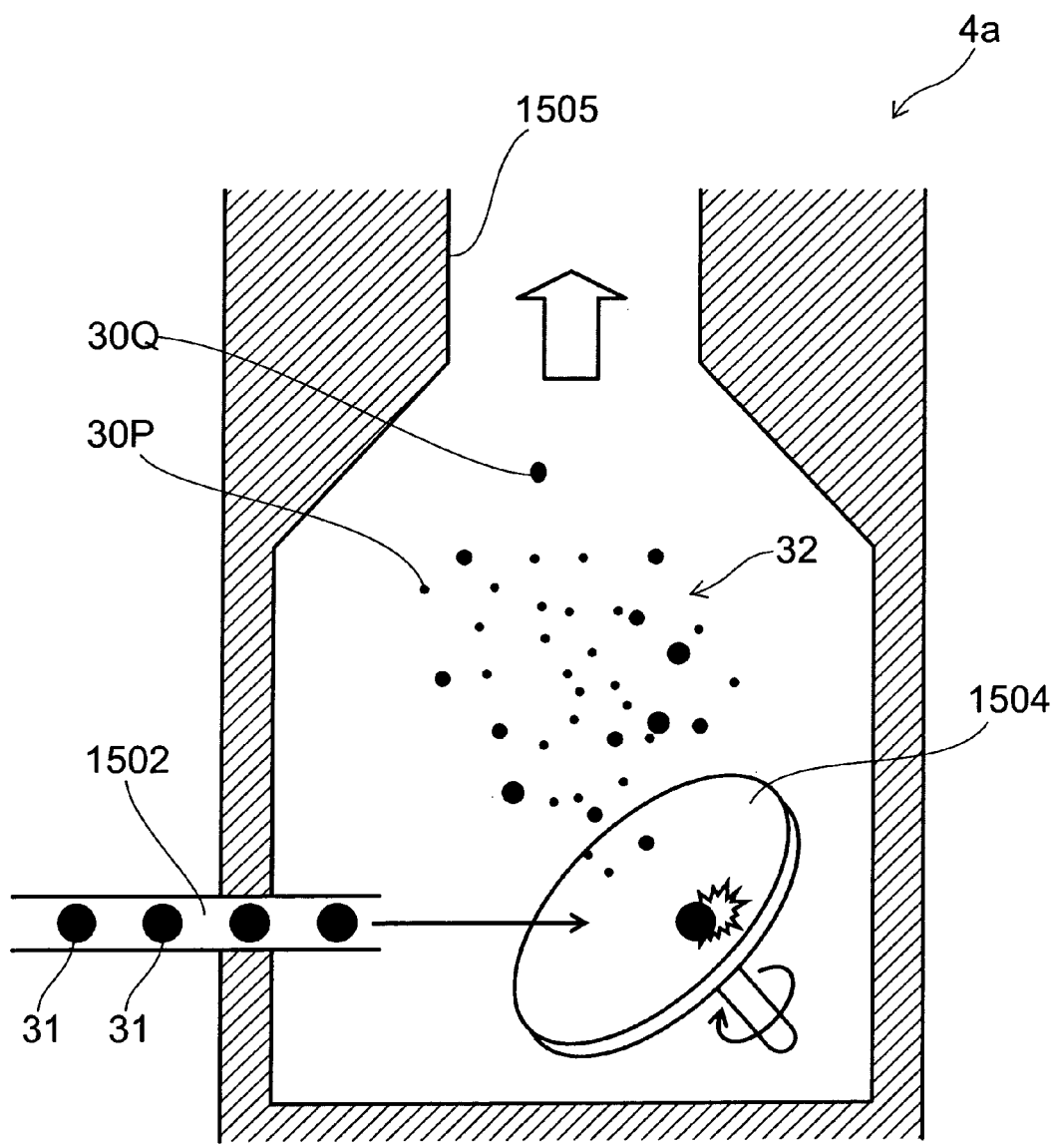
FIG. 31 is a schematic view for illustrating a first example of the aerosolation mechanism.

FIG. 31 is a schematic view for illustrating a first example of the aerosolation mechanism.

The aerosolation mechanism 4a includes a supply port 1502 for squirting controlled particles 31 with a gas, an impact plate 1504 provided in front thereof and serving as a mechanical barrier, and an ejection port 1505.

The controlled particle 31 squirted from the supply port 1502 receives an impact force when colliding with the impact plate 1504. This impact force disaggregates the controlled particle 31 into primary particles 30P, or aggregate particles 30Q with several primary particles 30P aggregated therein, which are dispersed in the gas to form an aerosol 32. The aerosol 32 is carried with the gas flow and ejected from the ejection port 1505.

Furthermore, by rotating the impact plate 1504, the motion vector of the controlled particle 31 at the collision point is generally opposed to the motion vector of the spray of the aerosol 32. Hence, the impact force on the controlled particle 31 can be increased. Consequently, the fine particle concentration in the aerosol 32 can be made more homogeneous.

The material of the impact plate 1504 is preferably hard, and can illustratively be a ceramic, such as alumina, silicon carbide, silicon nitride, and aluminum nitride. The speed of collision with the impact plate 1504 only needs to be such that the controlled particle 31 is sufficiently disaggregated, and is preferably slower than the speed at which a structure is formed on the surface of the impact plate 1504 by the impact of collision.

Ideally, this mechanical impact completely disaggregates the controlled particle 31 into primary particles 30P contributing to structure formation in the aerosol deposition method, and the structure formation efficiency is maximized in this case. However, actually, disaggregation only needs to be roughly completed so as to maintain the structure formation efficiency which allows structure formation with industrially applicability. This can be determined from the film thickness which can be formed per unit time.

Figure 32:
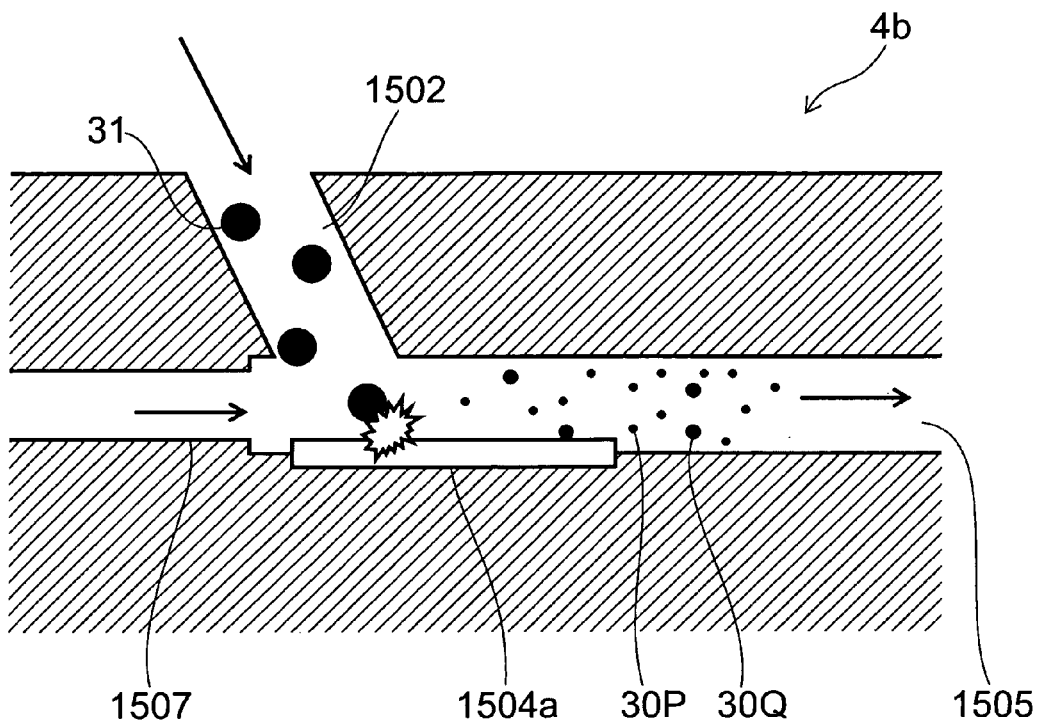
FIG. 32 is a schematic view for illustrating a second example of the aerosolation mechanism.

FIG. 32 is a schematic view for illustrating a second example of the aerosolation mechanism.

The aerosolation mechanism 4b includes a supply port 1502 for supplying controlled particles 31, a collision plate 1504a provided in front thereof and serving as a mechanical barrier, and an ejection port 1505. A gas supply port 1507 is provided generally parallel to the collision plate 1504a, and the ejection port 1505 is provided in front of the gas supply port 1507.

The controlled particle 31 is supplied on the gas flow, collides with the collision plate 1504a, and is thereby disaggregated into primary particles 30P, or aggregate particles 30Q with several primary particles 30P aggregated therein. By squirting a gas from the gas supply port 1507 to the collision location, the green compact adhered to the collision plate 1504a can be blown off, and a uniform aerosol can be generated.

Figure 33:
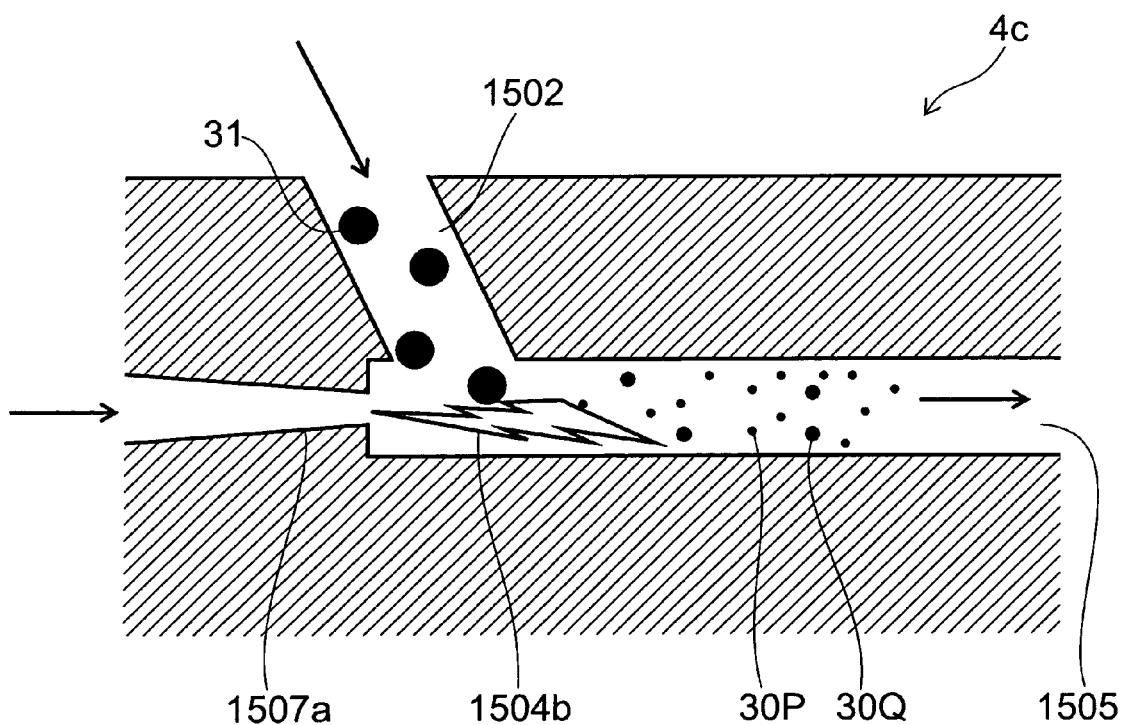
FIG. 33 is a schematic view for illustrating a third example of the aerosolation mechanism.

FIG. 33 is a schematic view for illustrating a third example of the aerosolation mechanism.

The aerosolation mechanism 4c includes a supply port 1502 for supplying controlled particles 31, a gas supply port 1507a for forming a pressure barrier in front thereof, and an ejection port 1505. The gas supply port 1507a is provided generally coaxial with the conduit provided with the ejection port 1505.

The controlled particle 31 is supplied on the gas flow and collides with the pressure barrier formed by the gas supply port 1507a. At this time, the controlled particle 31 is subjected to a shear force, and hence disaggregated into primary particles 30P, or aggregate particles 30Q with several primary particles 30P aggregated therein. Then, by the gas squirted from the gas supply port 1507a, a uniform aerosol is formed.

Figure 34:
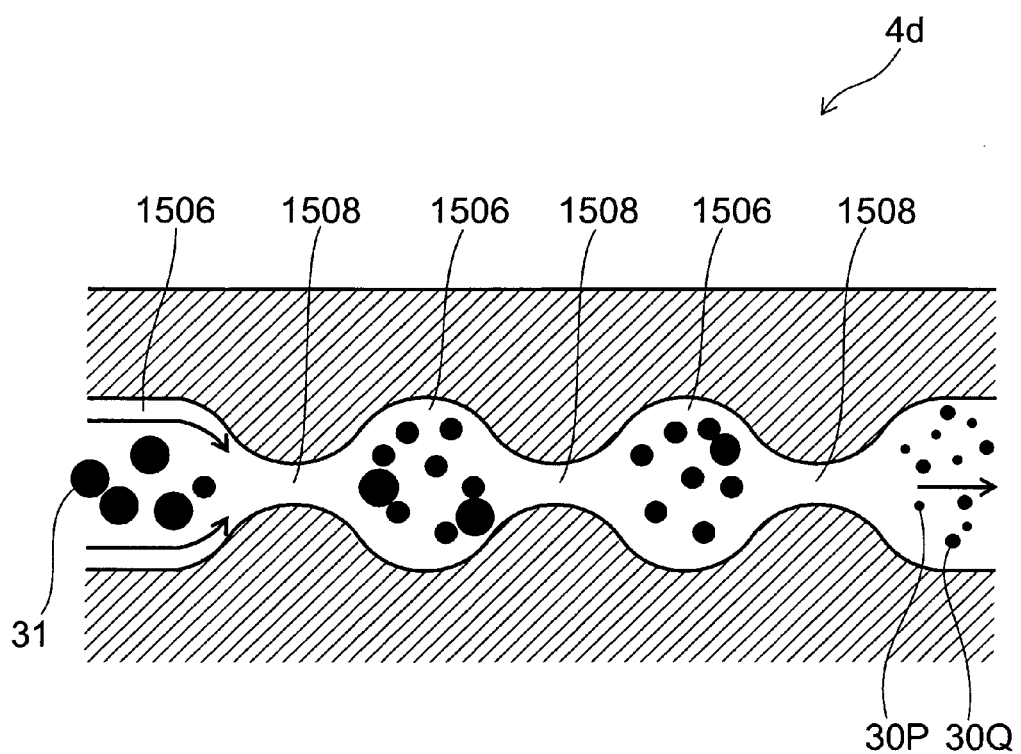
FIG. 34 is a schematic view for illustrating a fourth example of the aerosolation mechanism.

FIG. 34 is a schematic view for illustrating a fourth example of the aerosolation mechanism.

The aerosolation mechanism 4d includes a site 1506 having a large flow channel diameter and a site 1508 having a small flow channel diameter, which are alternately provided along the flow channel of the aerosol. Thus, the gas is compressed at the site 1508 having a small flow channel diameter, and expanded at the site 1506 having a large flow channel diameter. Repetition of such compression and expansion causes a shear force to act on the controlled particles 31 contained in the aerosol. This shear force disaggregates the controlled particle 31 into primary particles 30P, or aggregate particles 30Q with several primary particles 30P aggregated therein.

The number of sites 1506 having a large flow channel diameter and the number of sites 1508 having a small flow channel diameter are not limited to those illustrated, but can be suitably modified in accordance with the size, strength and the like of the controlled particle 31 supplied.

Figure 35:
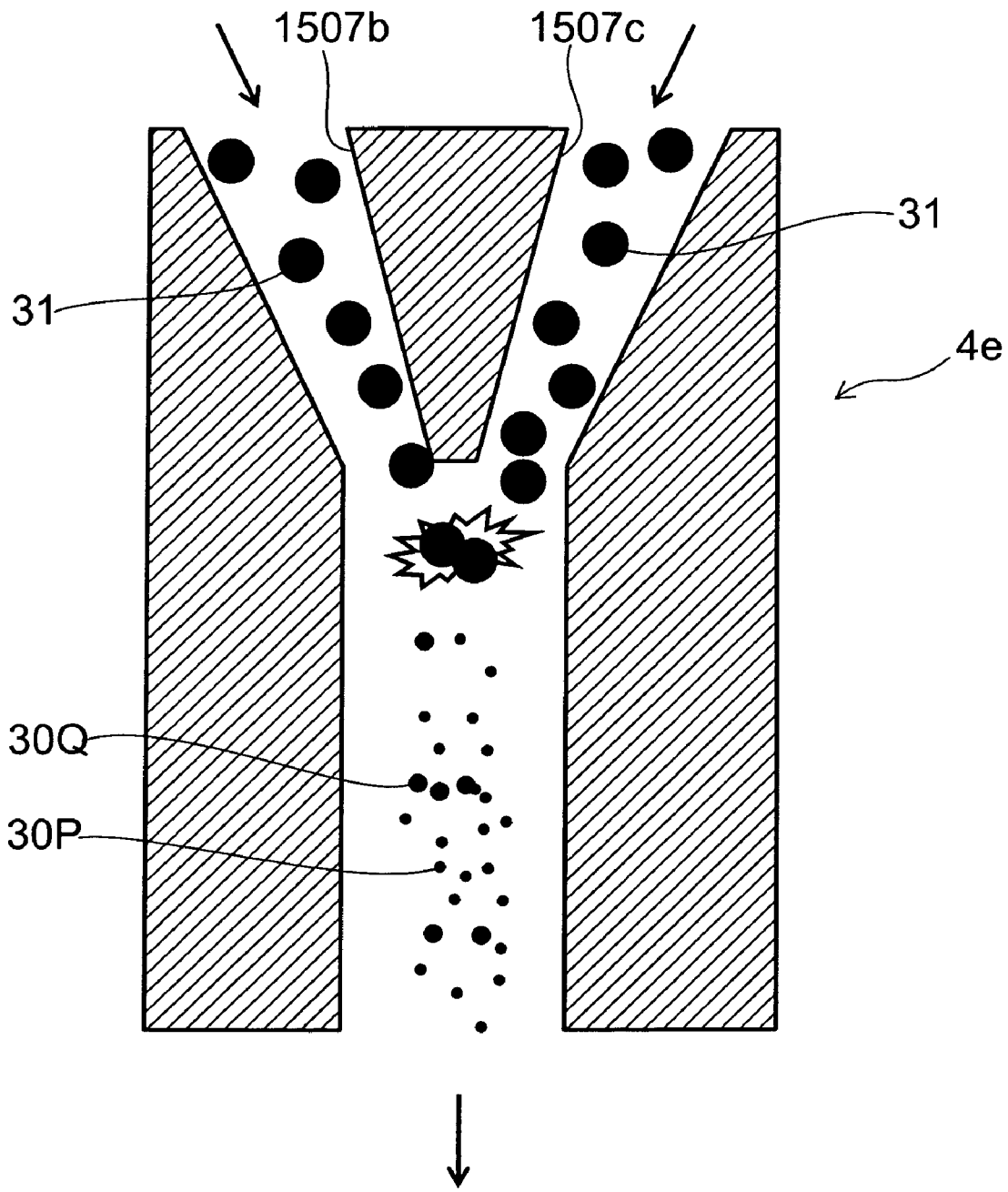
FIG. 35 is a schematic view for illustrating a fifth example of the aerosolation mechanism.

FIG. 35 is a schematic view for illustrating a fifth example of the aerosolation mechanism.

The aerosolation mechanism 4e includes a first gas supply port 1507b and a second gas supply port 1507c. The first gas supply port 1507b and the second gas supply port 1507c are provided so that their axis lines intersect each other.

Hence, controlled particles 31 supplied from the first gas supply port 1507b and the second gas supply port 1507c can be collided with each other. This collision disaggregates the controlled particles 31 into primary particles 30P, or aggregate particles 30Q with several primary particles 30P aggregated therein. In addition, this example can avoid collision of controlled particles 31 with the wall surface, and has an advantage of being less prone to contamination.

Controlled particles having a certain bonding strength or more and a controlled shape can be used in the aforementioned aerosolation mechanisms. Then, the controlled particles are easily disaggregated to produce an aerosol being rich in primary particles. Hence, the aforementioned aerosolation mechanisms are suitable for composite structure formation.

The invention claimed is:

1. A composite structure formation method based on an aerosol deposition method by which an aerosol with brittle material fine particles dispersed in a gas is sprayed toward a substrate to form a structure made of the brittle material fine particles, the composite structure formation method comprising the steps of:

storing a plurality of pre-formed controlled particles in a storage mechanism, each of the controlled particles being an assembly intentionally packed with a plurality of fine particles which are not chemically bonded together and which include the brittle material fine particles, the controlled particles are formed by using only the fine particles whose mean primary particle diameter is 0.1 µm or more and 5 µm or less, and the controlled particles having a mean circle-equivalent diameter of 20 µm or more and 500 um or less;

supplying the controlled particles from the storage mechanism to an aerosolation mechanism constantly;

disaggregating the supplied controlled particles into a plurality of the fine particles in the aerosolation mechanism to form an aerosol in which the fine particles are dispersed in the gas; and spraying all of the fine particles in the aerosol toward the substrate to form a composite structure of the structure and the substrate, wherein the controlled particles are controlled so that bonding strength between the fine particles includes a mean compressive fracture strength sufficient to substantially avoid disaggregation during the supply step, but which permits the controlled particles to be substantially completely disaggregated in the disaggregation step.

2. The composite structure formation method according to claim 1, further comprising the step of:

mixing the controlled particles with a gas introduced from a gas supply mechanism to produce a solid-gas mixed phase flow; and supplying the solid-gas mixed phase flow to the aerosolation mechanism.

3. The composite structure formation method according to claim 1, wherein the mean compressive fracture strength is controlled by manufacturing the controlled particles by adding the fine particles with at least one of water and a binder.

4. The composite structure formation method according to claim 1, wherein the controlled particles are disaggregated by mechanical impact applied in the aerosolation mechanism.

5. The composite structure formation method according to claim 1, wherein the mean compressive fracture strength of the controlled particles is 0.47 MPa or less.

6. The composite structure formation method according to claim 1, wherein the mean compressive fracture strength of the controlled particles is 0.34 MPa or less.

7. The composite structure formation method according to claim 1, wherein the mean compressive fracture strength of the controlled particles is 0.015 MPa or more.

8. The composite structure formation method according to claim 1, wherein the mean circle-equivalent diameter of the controlled particles is 0.65 or more.

9. The composite structure formation method according to claim 1, wherein the controlled particles have a D10 of 6.6 µm or more.

10. The composite structure formation method according to claim 1, wherein the controlled particles have a particle size distribution deviation ratio of 0.59 or less.

11. The composite structure formation method according to claim 1, wherein the controlled particles have an angle of repose of 48 degrees or less.

* * * * *